United States Patent [19]
Farmont

[11] Patent Number: 5,156,435
[45] Date of Patent: Oct. 20, 1992

[54] SUN ROOF

[75] Inventor: Rolf Farmont, Düsseldorf, Fed. Rep. of Germany

[73] Assignee: Farmont Produktion GmbH & Co. KG, Düsseldorf, Fed. Rep. of Germany

[21] Appl. No.: 445,596

[22] PCT Filed: Mar. 3, 1989

[86] PCT No.: PCT/EP89/00220

§ 371 Date: Nov. 8, 1989

§ 102(e) Date: Nov. 8, 1989

[87] PCT Pub. No.: WO89/08565

PCT Pub. Date: Sep. 21, 1989

[30] Foreign Application Priority Data

Mar. 8, 1988 [DE] Fed. Rep. of Germany ... 8803070[U]
Mar. 8, 1988 [DE] Fed. Rep. of Germany ... 8803071[U]

[51] Int. Cl.$^5$ .............................................. B60J 7/00
[52] U.S. Cl. .................................. 296/216; 296/218; 49/504; 52/476
[58] Field of Search .................. 296/216, 224, 120.1, 296/121, 218; 52/476, 766, 768; 49/504

[56] References Cited

U.S. PATENT DOCUMENTS 4,844,535 7/1989 Farmont ............................. 296/216
4,927,208 5/1990 Farmont ............................. 296/216

FOREIGN PATENT DOCUMENTS 0188774 7/1986 European Pat. Off. ............ 296/224
2129477A 5/1984 United Kingdom .

Primary Examiner—Dennis H. Pedder
Attorney, Agent, or Firm—Tarolli, Sundheim & Covell

[57] ABSTRACT

A vehicle sun roof has a frame part, such as a cover frame (3) for a cover (4) which can be opened and closed in relation to the roof covering (2). In the zone of the opening edge (2'), fastening devices (7), distributed on the circumference (perimeter) are necessary. The necessary holding forces between the roof covering and the frame are especially simple to mount and can be securely applied by a single installer. Complicated parts or mounting tools are not needed. The necessary holding forces are obtained through clamping devices, which consist, in each case, of at least one bolt (9) which can be rotated, pushed along or swung, and at least one blocking member (18) which can be gripped behind the bolt. The bolt is arranged on one, and the blocking member on the other of the parts to be joined together. Upon movement of the bolt into its locking position, it comes to rest against its respective blocking member so that, in cooperation with the blocking member, the necessary clamping forces between the frame parts to be joined are built up and then maintained. In this way, the time required for the installation of the sun roof is appreciably reduced.

6 Claims, 20 Drawing Sheets

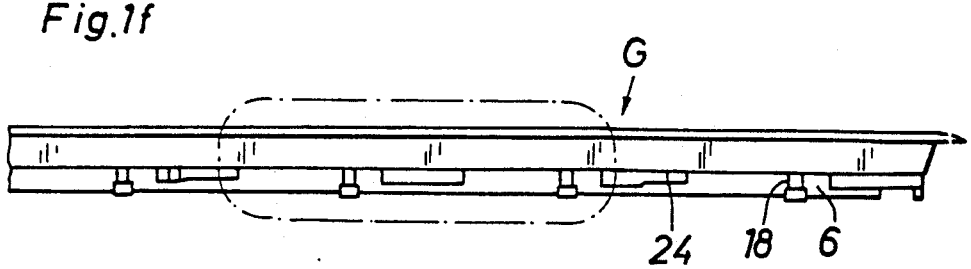
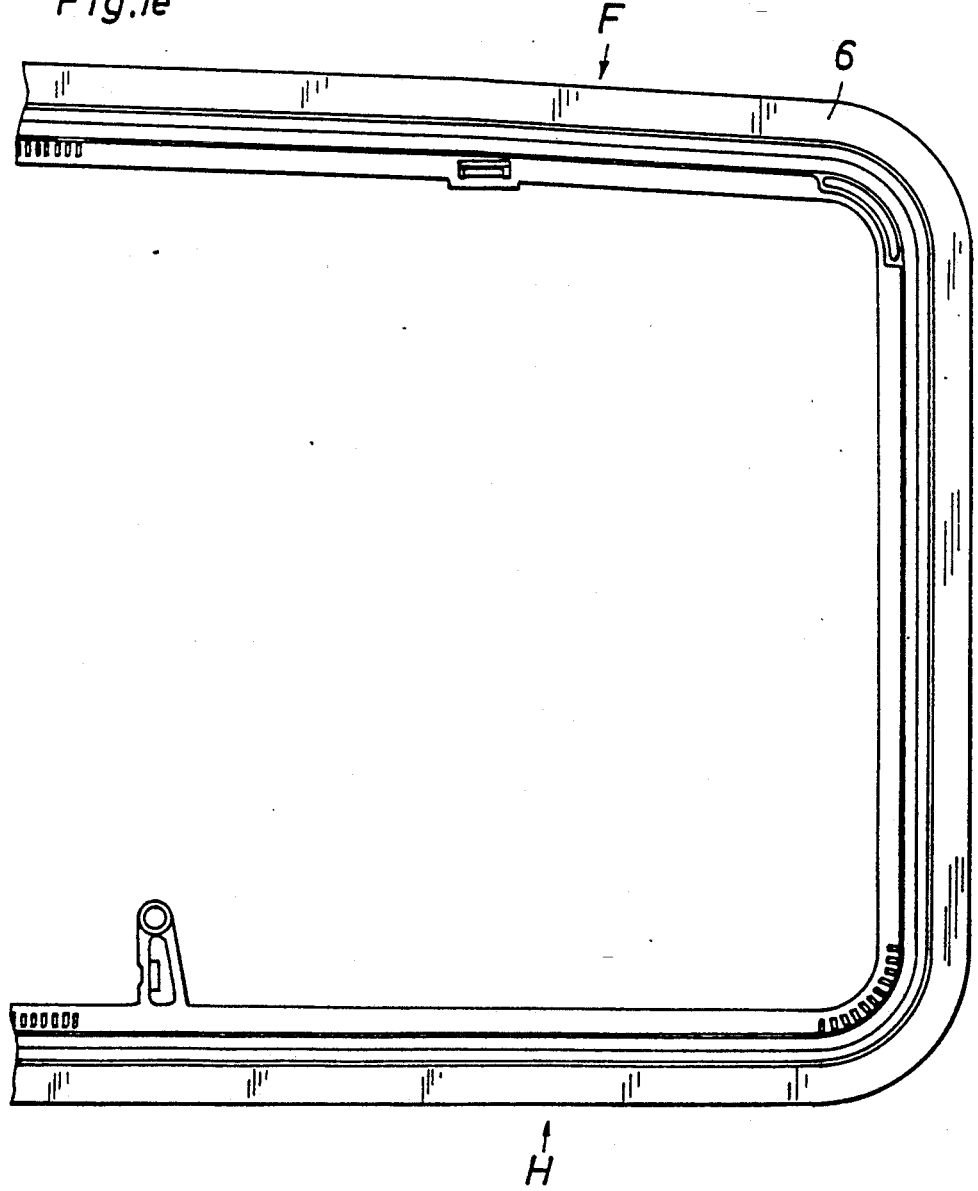

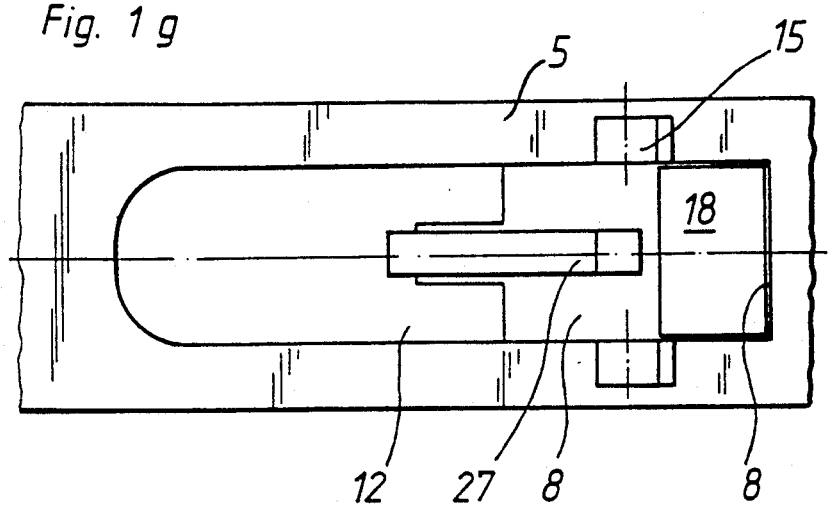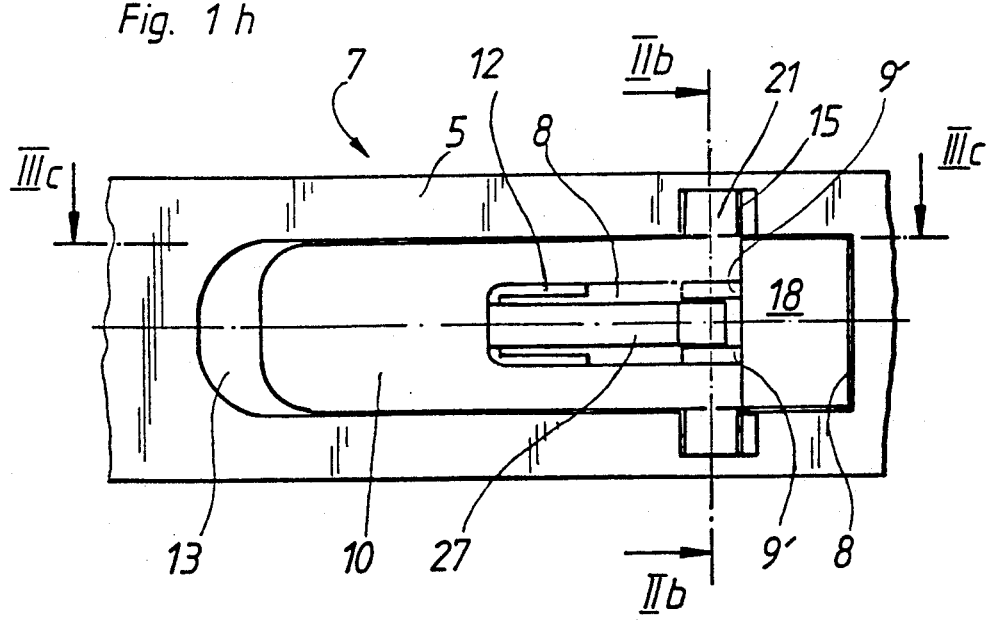

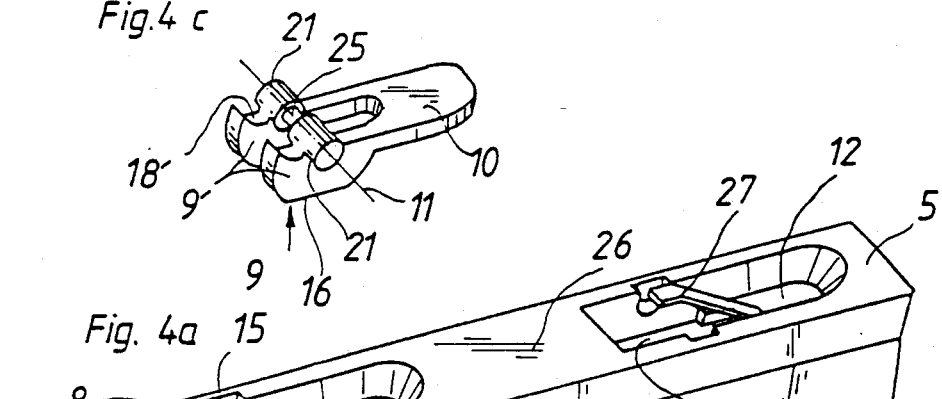
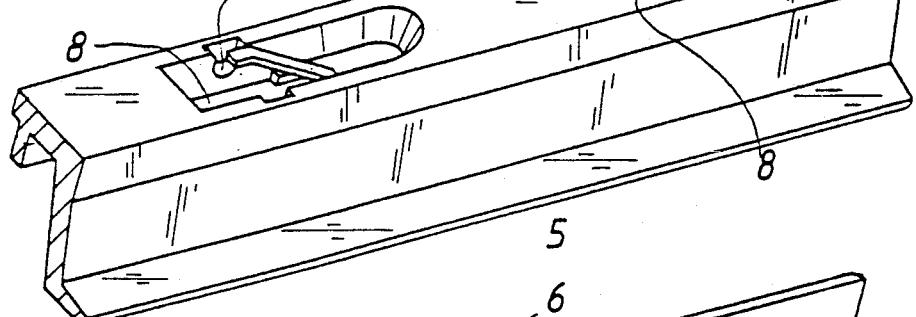
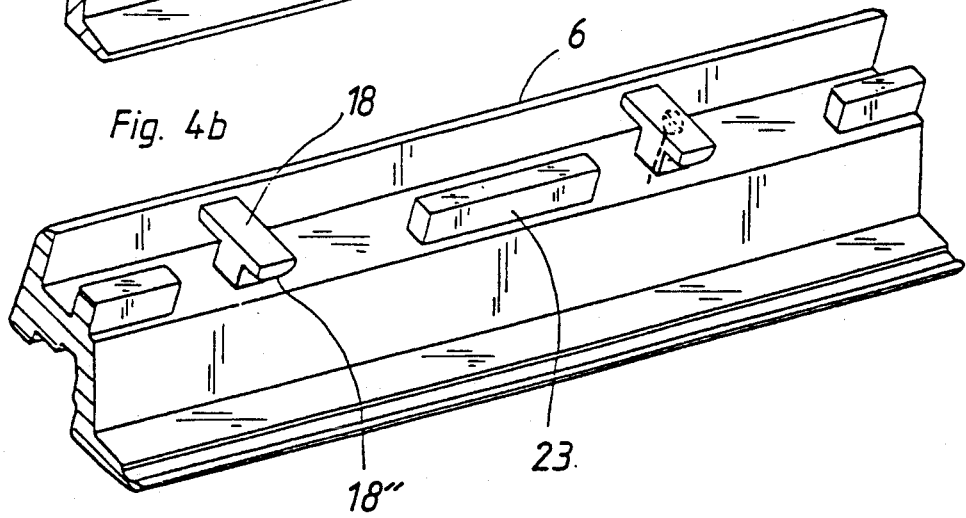

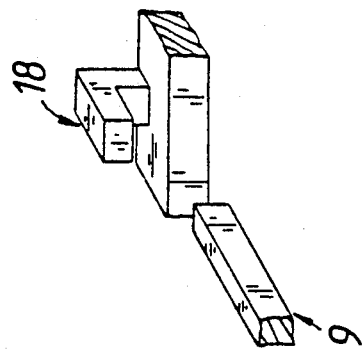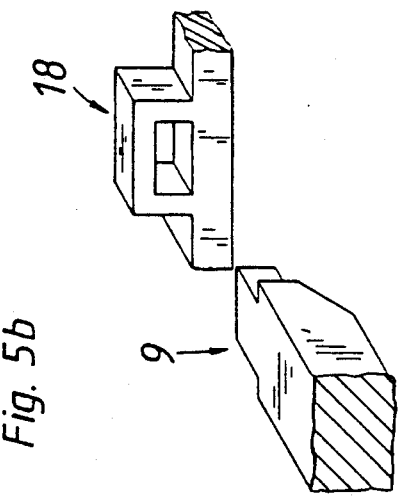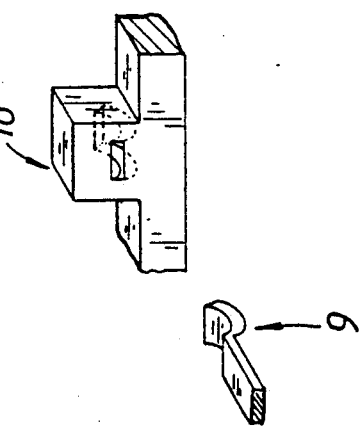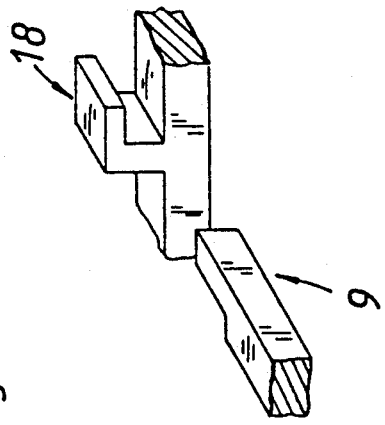

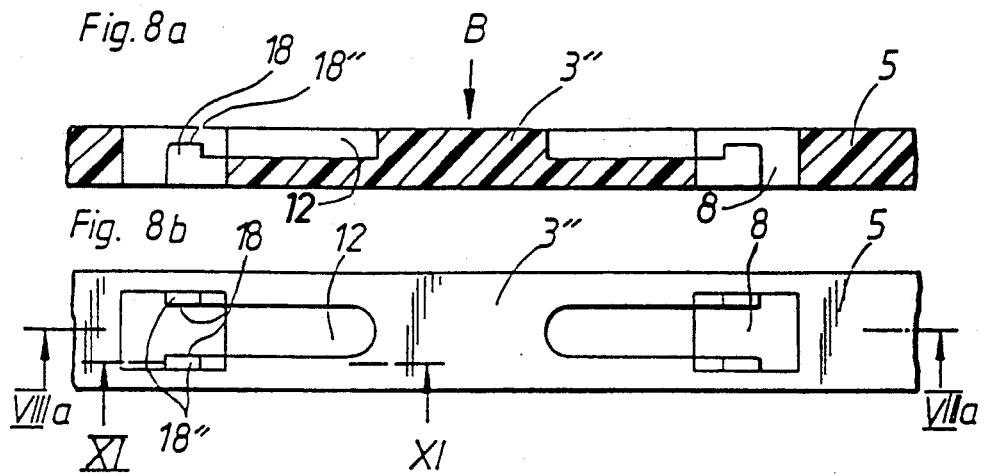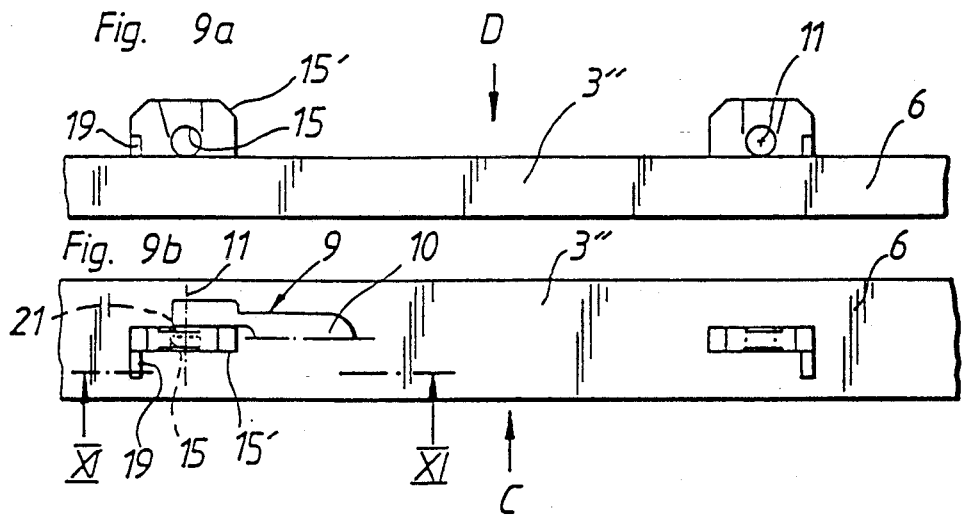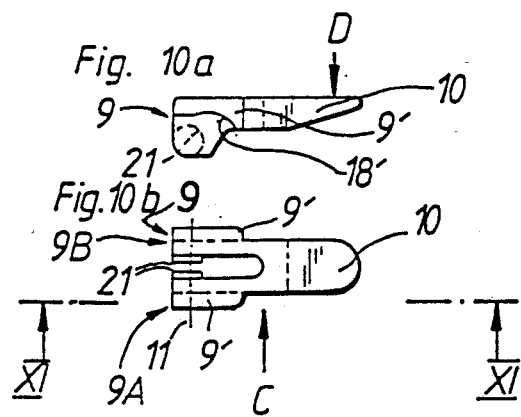

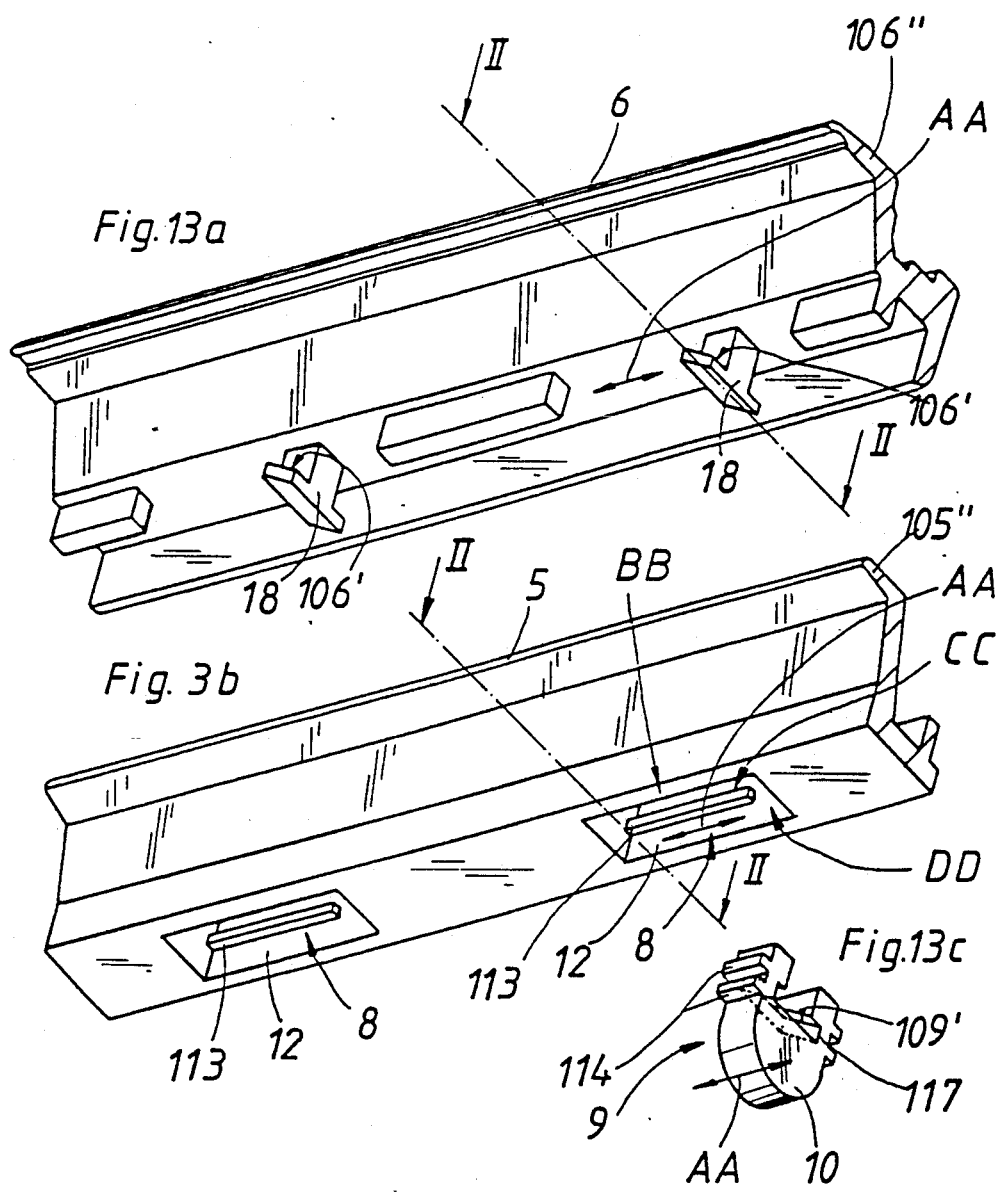

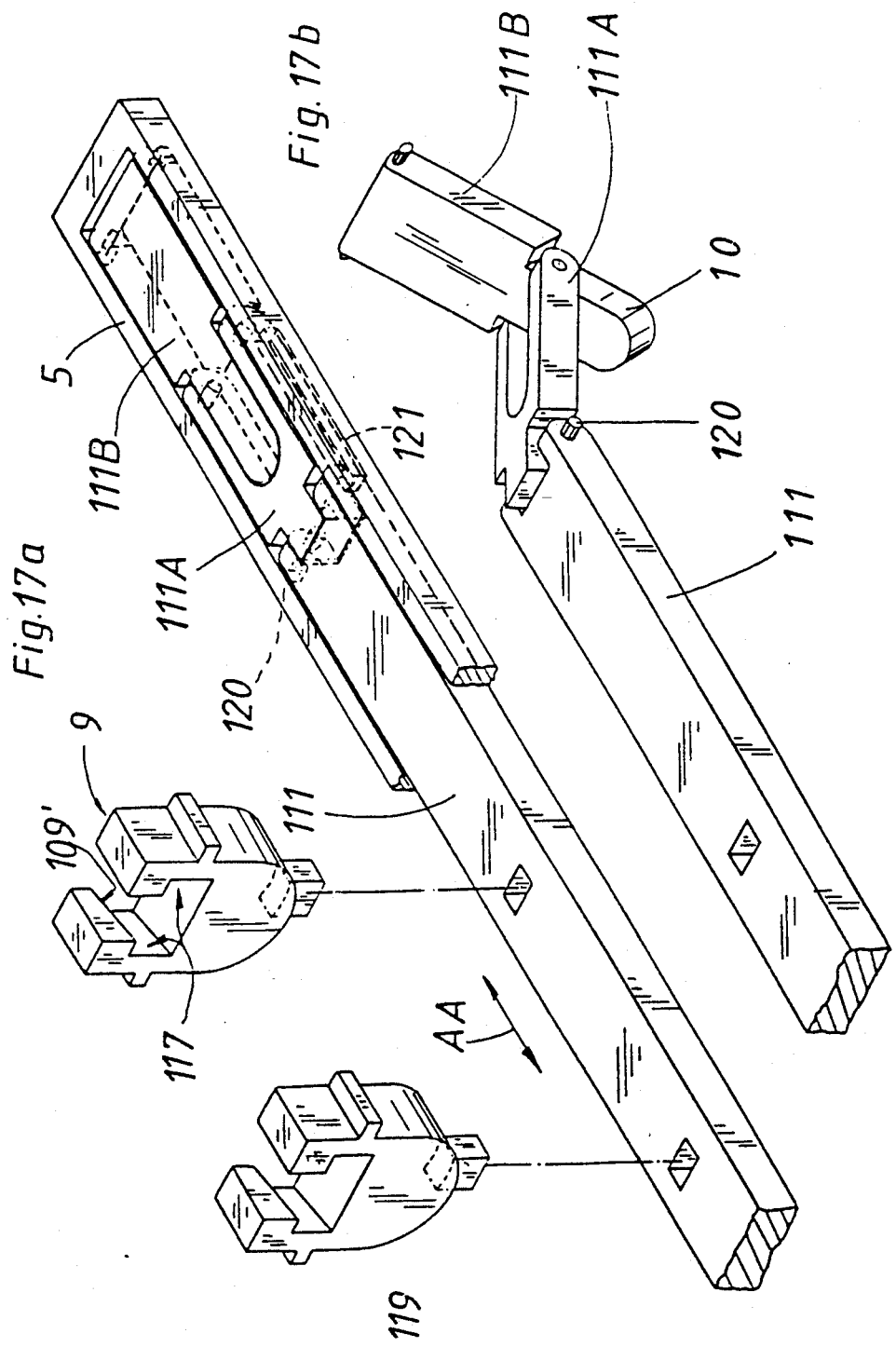

SUN ROOF

BACKGROUND OF THE INVENTION

The invention relates to a sun roof for vehicles, with a first and second frame forming a cover frame, and a cover which can be opened and closed, in which the cover frame can be fastened to a vehicle body by clamping the roof covering, in the zone of the edge of an opening, between the first and second frames, and in which a clamping mechanism, arranged distributed on the circumference of the cover frame, makes possible the maintaining of the necessary clamping forces between the first and second frames.

Such sun roofs are known from German Patent 3,241,652, according to which has been proposed, already, a clamp or snap connection for the first and second frames, as one possibility of connection. Such a catch clamp connection is known also from German Disclosure 3,545,973. In this case, either a stay provided with catch connections engages in a slot of the opposite frame, having corresponding catch elements, in order to produce the catch connection, or a special clamping profile surrounding the cover frame is used, which is spread in between one frame and its opposite frame, and thus holds the two partial frames of the cover frame into their final position, clamped into the roof covering; or one clamps a first partial frame, C-shaped in cross section, to a second partial frame which, in turn, is glued, welded, screwed, or caught to a third partial frame. In this known sun roof covering, a screw connection of the first and second partial frames is unnecessary because of the clamping connection; but it is also difficult, during installation, to apply the clamping force necessary for the permanent solid, sealed fastening of the cover frame to the roof covering, because the first and the second frames would have to be so strongly pressed by the fingers of one hand into the installed position, as the relatively high clamping force against the roof covering requires, while with the other hand, the clamping profile must be pressed into a relatively narrow groove until it catches. In practice, it has been found that the use of a special tool, to be able to apply the necessary forces, is inconvenient; this is not practical.

The surrounding clamping profile can be eliminated, it is true, if the first and second frames can be directly caught together, so that the fingers of both of the installer's hands are available for applying the necessary clamping force, but in this way the clamping force applied in spots is only slightly greater, and there is the drawback that with any necessary demounting of the cover frame, the catch connection is destroyed and the cover frame cannot be used again.

SUMMARY OF THE INVENTION

With this background, the invention addresses the problem of providing a cover frame of this kind which does not have the above-mentioned disadvantages, in which, in particular, the necessary clamping forces can be applied especially simply and securely, during installation, by a single installer, and without any special clamping profile or special tool being necessary.

The problem is solved, according to the invention, by the fact that:

the clamping mechanism consists of several clamping devices, and each clamping device consists of at least one bolt, which can be rotated, pushed along or swung, and of at least one blocking member gripping behind the bolt;

the bolt can be movably supported against the first or second frame, especially can be rotated, pushed along or swung, or supported or supportable on same, and the blocking members are arranged against the other frame, and fastened or can be fastened thereto (quite generally, therefore, can be applied); and the bolts, in rotating or moving along or swinging into the locking position, come into contact against their respective blocking members so that, especially in cooperation with the blocking members, the necessary clamping forces between the first and second frame are exerted, that is, built up and then maintained.

The invention is based, therefore, on the basic idea of using bolts or levers which can be rotated, pushed along or swung, by means of which the necessary clamping forces are applied in their rotation, moving along or swinging.

Each of these bolts can apply about the same clamping force as the screws usual up to now; unlike the screws, however, the bolts according to the invention need to be swung or rotated by only 90°, as a rule, or pushed along a few millimeters. The force necessary for this can be applied, to ergonomic advantage, by the installer, since the pressing together of the two partial frames between the thumb and the fingers of one hand, needed in clamp connections up to now, is eliminated.

In particular, a handle piece, which according to a further development of the invention, can be arranged permanently on the bolt, or can grip against the bolt, results in a simple application of pushing force and a relatively great increase of force, so that the relatively great clamping forces to be applied on the bolt require much less force against the handle piece (made correspondingly long). Some other advantages of the invention are that there can be realized a relatively large clamping distance, relatively large locking surfaces between bolt and blocking member, and relatively large bearing surfaces between the bolt and the first or second frame on which the bolt is supported, rotatable, movable along or swingable. In this way, each clamping device can apply a relatively great force, even when, for reasons of the available dimensions of the cover frame, it must be kept relatively small, and/or the whole clamping mechanism or even the partial frames of the cover frame are made of plastic material. Another advantage is that the bolts can be changed individually, even when the cover frame is installed and all the other bolts are in their locking position. For bolts which can be pushed along, with wedge-shape locking pressure surfaces, the flatter the rise of the locking surfaces, directing in pairs, the greater the attainable clamping force and the self-inhibition against an undesired opening of the clamping device. Typical rise angles are between 1° and 45°.

"Sun roofs", in the sense of the invention, are any sliding and/or lifting roofs with a cover, light-translucent or not, which can be pushed along and/or lifted, for factory installation but especially for later installation.

The "first and second frames", forming in common the cover frame may, as preferred, be enclosed in each case, but may also be composed of several parts, especially individual frame strips; the trim rings mentioned in German Disclosure 3,545,973 also fall within the first and second frames which may be used according to the invention. The frame material may be of metal, for instance, especially light metal, or, as preferred, of plastic. Preferably at least one of the two frames is a one-piece molded plastic part, enclosed all-around. One of the two (first or second) frames may be permanently joined with the vehicle body at the factory; in particular, it may form one piece with the roof covering; somewhat as illustrated in German Disclosure 3,545,973 in connection with FIG. 11. Then the clamping in of the roof covering is limited to a clamping with the (second or first) frame, not permanently joined, at first. Naturally, the functions of the first and second frames may be exchanged. It also does not matter which of the two frames is arranged above or below the roof covering.

The first and second frames preferably have, at least directly next to the body, corresponding contact surfaces approximately perpendicular to the clamping direction, through which the clamping forces are transmitted especially effectively to the roof covering.

The "bolts" are so formed, according to the invention, and are supported rotatable or movable along or swingable against the first or second frame, that in their locking position they grip behind the respective blocking members. For this purpose, the bolts might be curved concave in the direction of movement in the zone of their contact surfaces for contact with the blocking members. But generally any kind of rotatable, movable along or swingable bolting is suitable.

The effective "lever length" of the bolt should be as slight as possible, at least in the locking position. On the other hand, the effective lever length at the beginning of the locking process may be relatively great; in this way, relatively great clamping distances can be obtained. In rotating or swinging the bolts into the locking position, the effective lever length (as in a "pelican hook") becomes increasingly shorter, and the clamping force which can be transmitted increasingly greater. In principle, eccentric pieces which can rotate around an eccentric axis, may also be used as rotatable or swingable bolts.

The "blocking members" according to the invention are so designed that they are increasingly gripped behind by the respective bolts during their rotation or moving along or swinging. The simplest form of a blocking member may consist, therefore, of a so-called "cut-back" which is provided in the respective first or second frame in the zone of an opening. Instead of a one-piece design of the blocking member with the respective first or second frame, the blocking members may also be fastened to the latter separately, by screws, for example. This latter kind of fastening is recommended especially in frames of plastic molded parts, since in this way, the expense of the cutting back is avoided. The blocking members may also project out beyond those surfaces of their respective first or second frame which are joined with the other frame in their installation into the vehicle roof. For this purpose, the other (second or first) frame must have an opening or aperture to receive the blocking member, the bolt preferably engaging also in this opening. Preferably, the second or first frame has an opening transverse to the plane of installation.

The bolts might also be supported, for instance, against that side of their respective (second or first) frame which lies opposite the contact surface with the other frame. This is done in such manner that the bolt, in its rotation or moving along or swinging into the locking position in the opening, grips into or through it and behind the blocking member lying opposite.

By "installation condition" is understood that situation in which one frame lies against the roof covering on one side and the other against the opposite side, and independently of whether the two frames are already clamped together or not. As soon as the two frames are clamped against each other, the bolt is in its locking position.

"Handle pieces" or "handle elements" are, as a rule, one-arm levers or tongue-form shapes, which can be joined or are joined, force or form-fitting, with the bolts of the invention, or which are made in one piece with the bolts. The force for the rotation or swinging or moving along of the bolt of the invention, into the locking position (or out of same) engages against the free end of the handle piece or element. For example, a screw driver may be used as a handle piece, the blade of which grips radially (in relation to the axis of rotation) into a corresponding opening of the bolt, in the radial direction. In another embodiment of the invention, the handle piece is permanently connected with the bolt, especially in one piece, and dips, preferably in the locking position, into a depression of the cover frame, completely or nearly so, so that disturbing elevations on the cover frame are avoided. The bolt also is preferably completely within the cross section area of the cover frame, at least when it is in the locking position. Several bolts may also be pushed along in common by the push rod.

The rotatable or swingable support of the bolt in the respective second or first frame may take place either by means of pins and corresponding pin receivers, and thus through support at the point of rotation, or through bent slide receivers and pins engaging therein, with the bearing surfaces thus relatively far outside the axis of rotation. This latter arrangement has the advantage that in this way, a translational movement of the bolt during its rotation or swinging is made possible, and not only a rotational movement. In particular, movable bolts may also move along a straight line.

If, according to another development of the invention, the bolt or handle piece can be caught into the locking position, the strength of the clamping force can be defined more exactly than with a friction closing (possible in principle) of the bolt into the locking position.

The installation of the cover frame can be further simplified if, in accordance with another development of the invention, the clamping mechanism, before the rotation or pushing along or swinging of the bolt into the locking position, can be brought into a fixing position, in which the first and second frames are held in their mutual position. In this way, quite considerable or even very slight clamping forces can be exerted on the roof covering of the vehicle. In this way, the exact seating of the frame on all sides can be checked, before the roof covering is clamped in between the two partial frames with the final clamping force; in particular, the exact seating of the sealing elements generally lying against the roof covering can be checked before these are deformed under the clamping force. A fixing position may be produced, for example, by the fact that the bolts already grip behind the blocking members for a certain distance, or that the bolts are otherwise rotated, swung or pushed along before they are rotated, pushed or swung into the locking position. There may also be carried out a first gentle catching of the clamping mechanism, with a more or less loose joining of the first and second frames. In the fixing position, the clamping mechanism could be tightened without the installer having to continue holding fast the parts.

Further suitable developments of the subject of the invention, which assure in particular a more secure use and performance as well as a simple production, are contained in the further claims.

The parts mentioned above, to be used according to the invention, are subject to no special conditions as to their size, shape, choice of material and technical concept, so that the criteria of choice in the particular field of use may be used without limit.

BRIEF DESCRIPTION OF THE DRAWINGS

Other details, features and advantages of the subject invention will appear from the description which follows, of the respective drawings, in which are represented preferred forms of execution of a sun roof according to the invention. In the drawing:

FIG. 1e is a view from above of the same outer frame half as in FIGS. 1c and 1d, (view G in FIGS. 1d and 1f).

FIG. 1f is a rear view of the same outer frame, (view H in FIGS. 1c and 1e).

FIG. 1g is an enlarged detail of the inner frame in FIG. 1a, in which the outer frame is already put on (seen from the rear), but without the bolt and handle piece according to the invention.

FIG. 1h shows the same detail as in FIG. 1g, but with bolt and handle piece, and in the locking position.

FIG. 4a is a perspective detail of the inner frame in FIGS. 1a and 1b.

FIG. 4b is a perspective detail of the outer frame in FIG. 1f.

FIGS. 5a to 5e are alternative forms of execution of a clamping mechanism according to the invention shown in diagramatic detail, in perspective.

FIG. 8a shows the inner frame (detail view) of one of the last forms of execution of a sun roof, in vertical section along the frame profile (along line VIIIa—VIIIa in FIG. 8b).

FIG. 8b shows the same inner frame from below (view B in FIG. 8a).

FIG. 9a shows the outer frame from the same sun roof, in side view (view C in FIG. 9b).

FIG. 9b shows the same outer frame from below (view D in FIG. 9a).

FIG. 10a shows a bolt of the, same sun roof, in side view (view C in FIG. 10b).

FIG. 10b shows the same bolt from below (view D in FIG. 10a).

FIGS. 13a to 13c show a perspective view of a frame strip 3' of the same sun roof, FIG. 13a, a detail from the outer frame, FIG. 13b a detail from the inner frame and FIG. 13c, a bolt.

FIG. 17a and 17b show, from another execution of a sun roof, several bolts with a common pushing mechanism, in the extended position corresponding to a locking position (FIG. 17a), and a bent position corresponding to an unlocked position (FIG. 17b), represented from above, partly in exploded view (FIG. 17a).

DESCRIPTION OF PREFERRED EMBODIMENTS

Figure 1A:
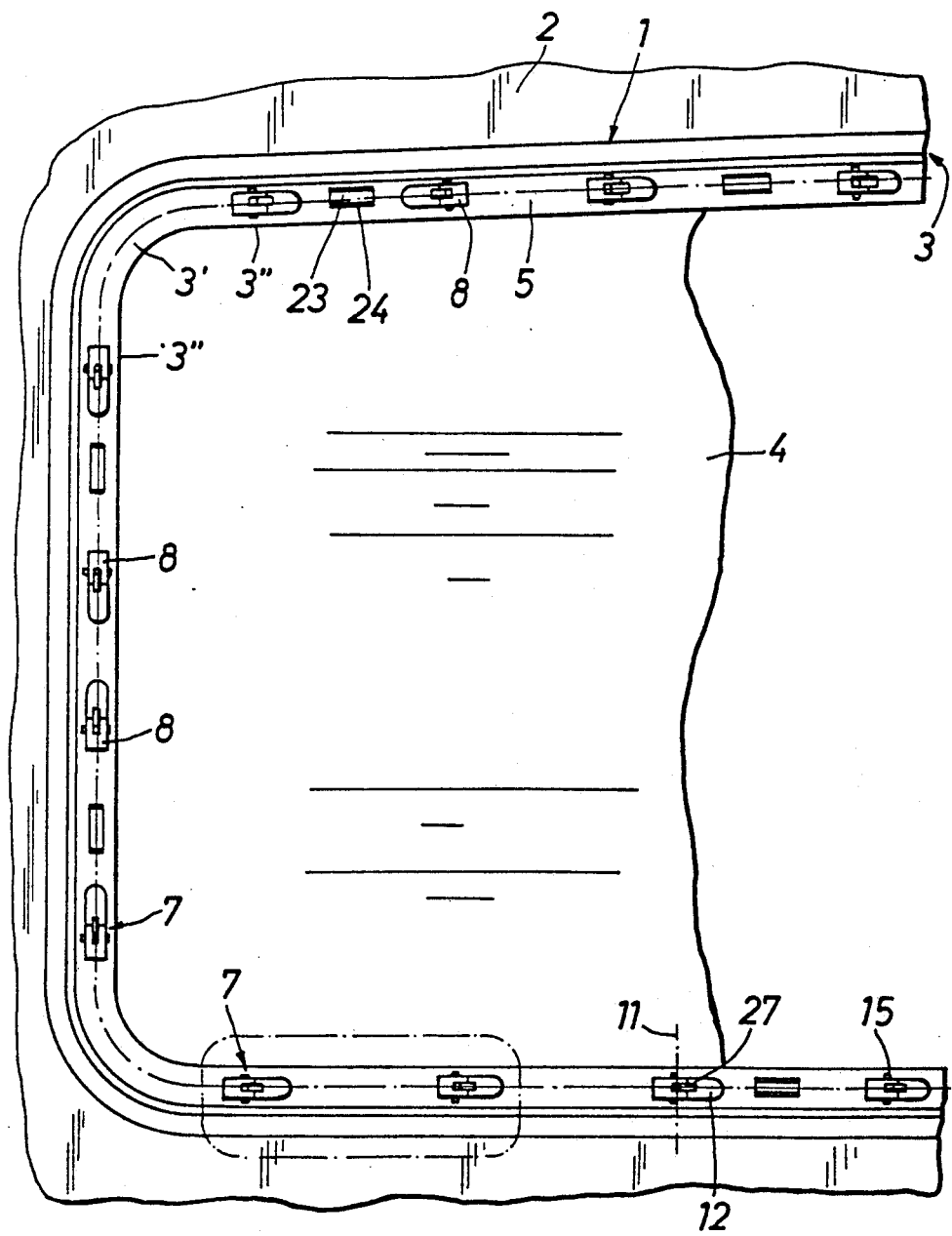
FIG. 1a shows a sun roof installed in a vehicle roof, seen from below, showing only half the inner frame (here the "first" frame).
Figure 1B:
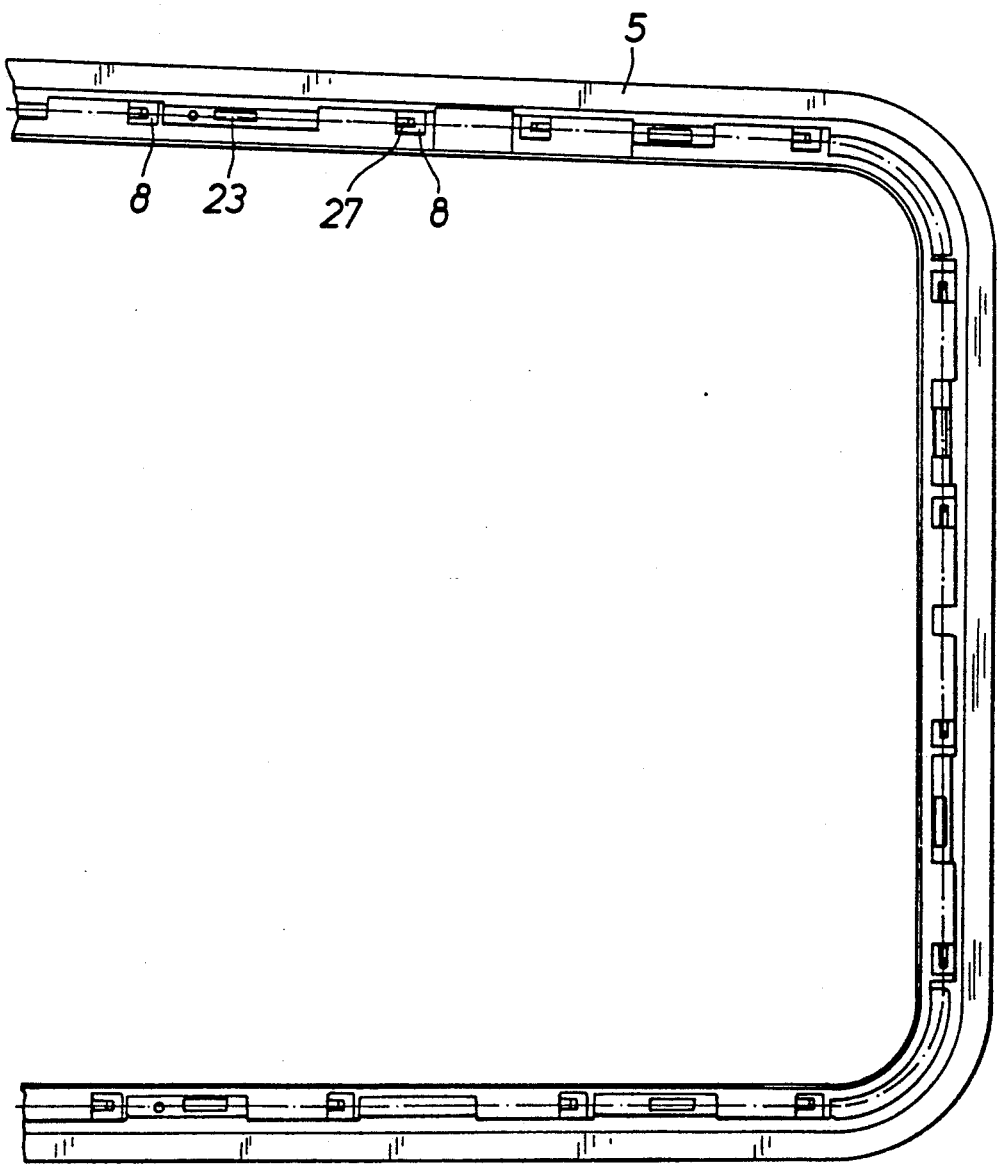
FIG. 1b is a sectional representation of the same frame half (in FIG. 1a), seen from above.
Figure 1D:
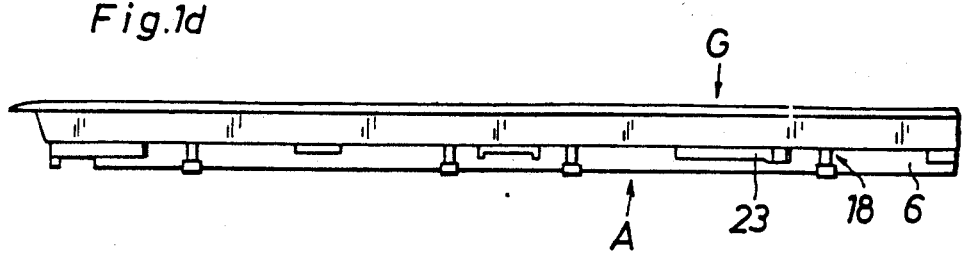
FIG. 1d shows a frontal view of the outer frame in FIG. C, (view F in FIG. 1c).
Figure 1C:
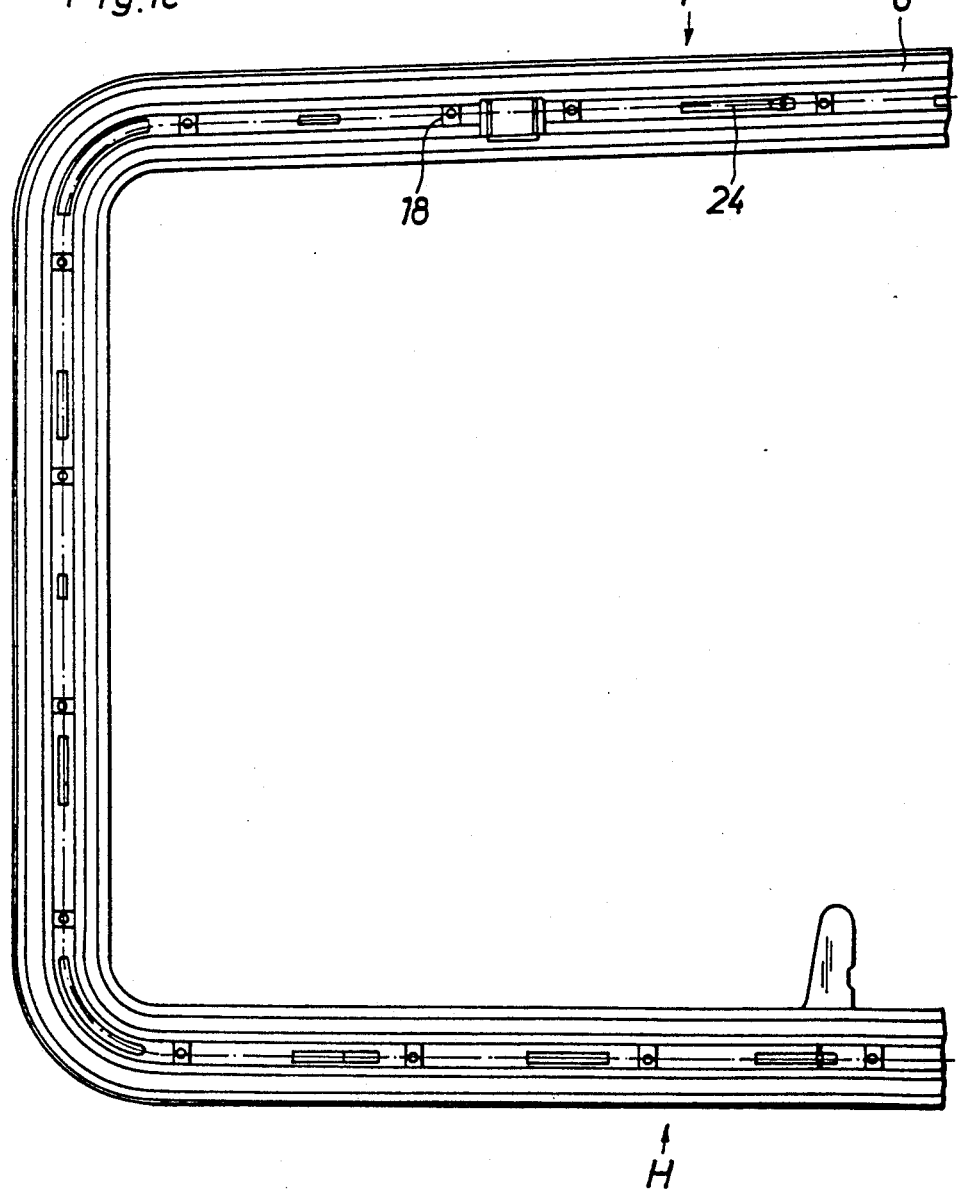
FIG. 1c shows the outer half frame from the same sun roof, (here, the "second" frame), seen from below (view A in FIG. 1d).

As illustrated in FIG. 1a, a sun roof 1 is installed in the roof panel 2 of a vehicle. The sun roof includes a cover frame 3 and a cover 4, which can be opened and closed in the known way, in plate form and forming, approximately, a common plane with the roof covering 2. The actuating mechanism for the cover is omitted for clarity; it may be designed, for example, as in German Patent 3,241,652.

Figure 2B:
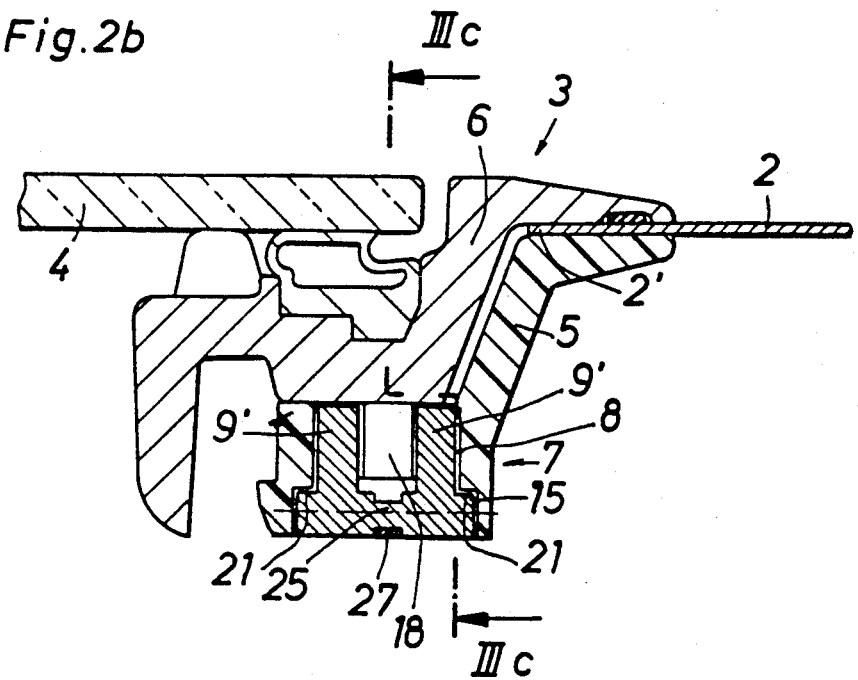
FIG. 2b shows another vertical section of the same sun roof, transverse through the cover frame (along line IIa-IIb in FIGS. 1h and 3c), with one bolt-handle piece combination swung into the locking position.
Figure 2A:
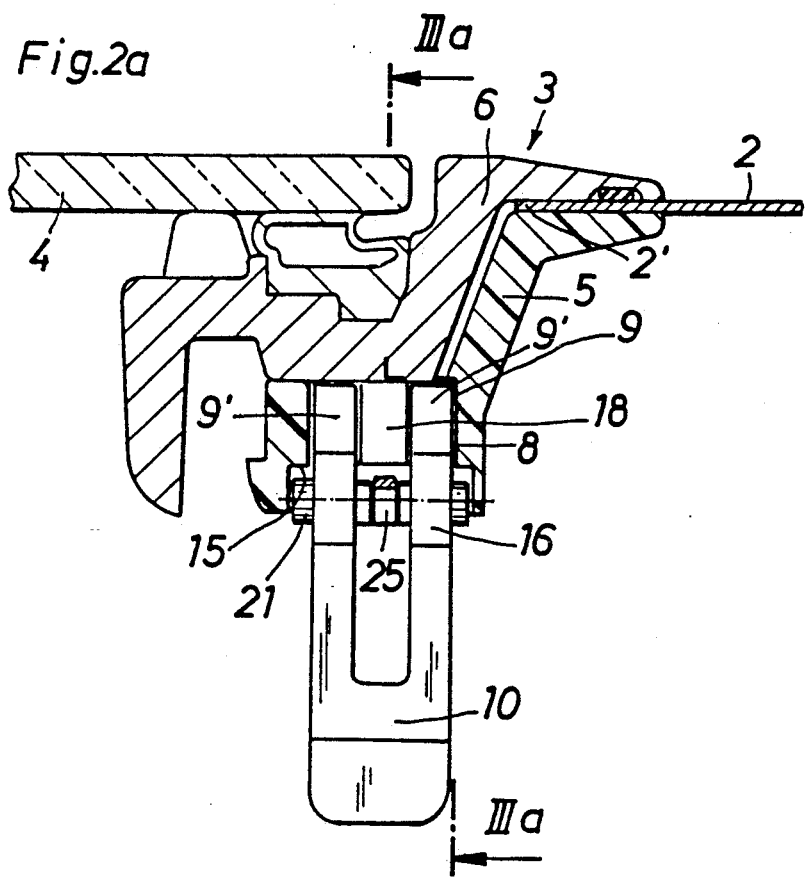
FIG. 2a shows a vertical section of the same sun roof as in FIGS. 1a to 1h, transverse through the cover frame (along the line IIa-IIa in FIG. 3a), in which the inner and outer frames already clamp the roof covering between them, while the one bolt-handle piece combination is not yet swung into the locking position.

As seen in FIGS. 2a and 2b, the cover frame 3 includes a first and a second frame. In the example shown in FIGS. 1a to 4b, the first frame is an inner frame 5, which can be clamped from below with the roof covering 2, and the second frame is an outer frame 6 which can be clamped from above to the roof covering 2. Naturally, the outer frame can take over the function of the inner frame and vice versa. The roof covering 2, therefore, is clamped between the outer frame 6 and the inner frame 5 in a watertight and mechanically stable manner, in the region of an edge 2' of an opening in the roof covering 2 (see FIGS. 2a and 2b). In this way, the cover frame 3 may be fastened to the vehicle body. Form fitting elements 23 and 24 on the first and second frames, corresponding in form and aligned in the installed condition so as to engage one in the other (as can be seen from FIGS. 1a to 1f) assure an exactly positioned mounting of the first and second frames.

Instead of the screws normally used for clamping the first and second frames to the roof covering, in accordance with the present invention, clamping devices 7 are used. These are evenly distributed on the circumference of the cover frame 3. For example, in the sun roof according to the invention, as many clamping devices are provided as there are screws in the known sun roofs. The corner zones 3' of the cover frame 3 preferably remain free of clamping devices (see FIG. 1a). Sufficiently great clamping forces can still be exerted on the corner zones. For this purpose, the axes of swinging of the bolts (to be explained later) are preferably disposed perpendicular to the longitudinal extent of the frame strips 3'' of the cover frame 3. Also, for this purpose, the free ends of the handle pieces 10, (also to be explained), in the locking position, point away from the corner zones 3', so that the axes of swinging of the bolts can be disposed directly at the transition between the corner zones 3' and the frame strips 3.

The clamping devices 7, forming the clamping mechanism according to the invention, are constructed as follows.

The first frame (for example, the inner frame 5 in the example according to FIGS. 1a to 4b) has openings 8 distributed over its circumference; these have preferably a rectangular polygonal cross section. Adjacent these openings 8, bearing surfaces 15 are provided on the inner frame 5, which serve as bearing surfaces for swinging of the bolts still to be explained.

According to FIGS. 1c to 1f, the second frame (the outer frame 6 in this example), has blocking members 18, which are so distributed on the circumference of the outer frame 6 that they can be pushed into the openings 8 of the inner frame 5.

As can be seen especially well from FIGS. 3a to 3c, each blocking member 18 has on its underside, facing away from the inner frame 5 and facing toward the outer frame 6, one or more sliding surfaces 18'', for the bolts 9, as will be explained later.

As can be seen from FIGS. 5a to 5e, the blocking members 18 and, consequently, the bolts 9 also may have the greatest variety of design. One especially stable form of execution of a blocking member 18, favorable for the transmission of clamping forces, can be seen in FIGS. 3a to 3c and 4b. The blocking member shown there has substantially a T-shape. The two arms of the T have on their undersides the sliding surfaces 18'', behind which grip the bolts 9. The free end of the T upright is connected in one piece with the outer frame, but the blocking members might also be fastened, advantageously, by means of screws, to the outer frame 6. This is shown in broken line in FIG. 4b, as an alternative.

In the form of execution according to FIGS. 3a to 4c, each bolt 9 includes two arms 9', arranged parallel and bent in hook form, joined at one location by a connection stay 25, and at another place by a handle 10. The connection stay 25 is arranged approximately concentric with the swinging axis 11 of the bolt 9. Outside each arm 9' of the bolt 9 there is provided a swing bearing pin 21 pointing outward. The radial circumferential surface of each swing bearing pin 21 corresponds to the bearing surface 15 in the inner frame 5. The swing bearing pins 21 can preferably be set from the inside horizontal surface 26 of the vehicle, into the inner frame 5, that is, into the openings forming the bearing surfaces 15. A tongue 27, which can bend elastically, either fastened to the inner frame 5 or made in one piece with it, secures the installed bolt 9 from falling out, in the zone of its connection stay 25.

Figure 3A:
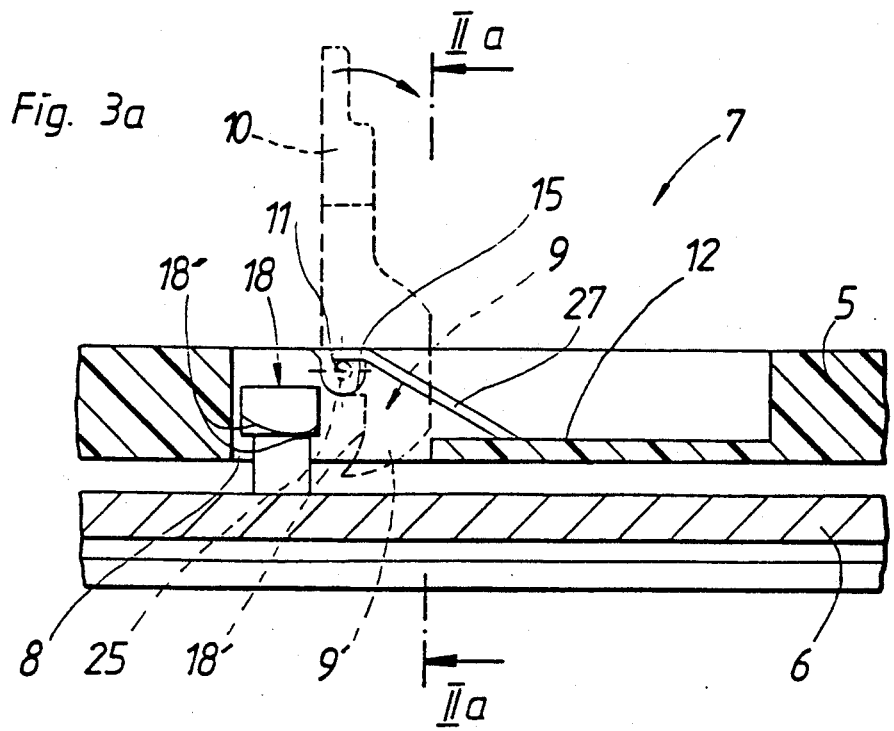
FIG. 3a shows a vertical section of the same sun roof, along the cover frame, in the still unlocked position of the bolt-handle piece combination, (section along line IIIa—IIIa in FIG. 2a), but without the cover and cover sealing, and namely, in the condition before the inner and outer frames have clamped the roof covering between them.
Figure 3B:
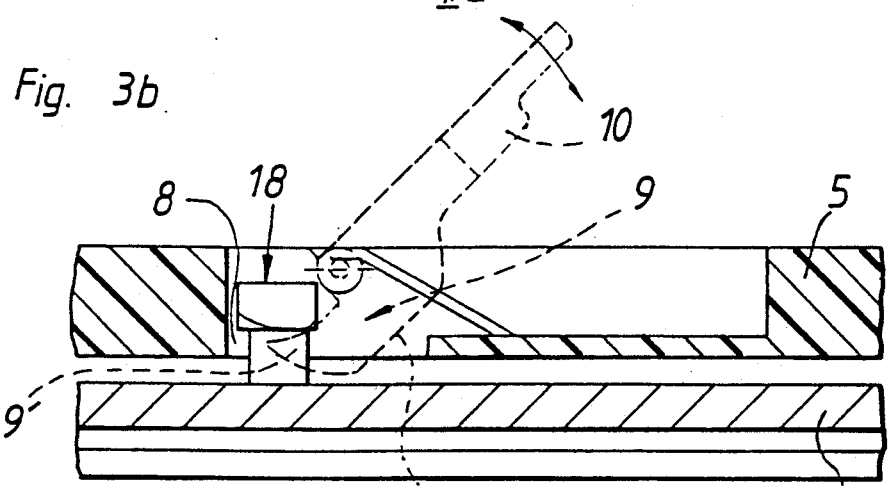
FIG. 3b shows the same sun roof in the same section as in FIG. 3a, in which the bolt-handle piece combination is in a partial locking position.
Figure 3C:
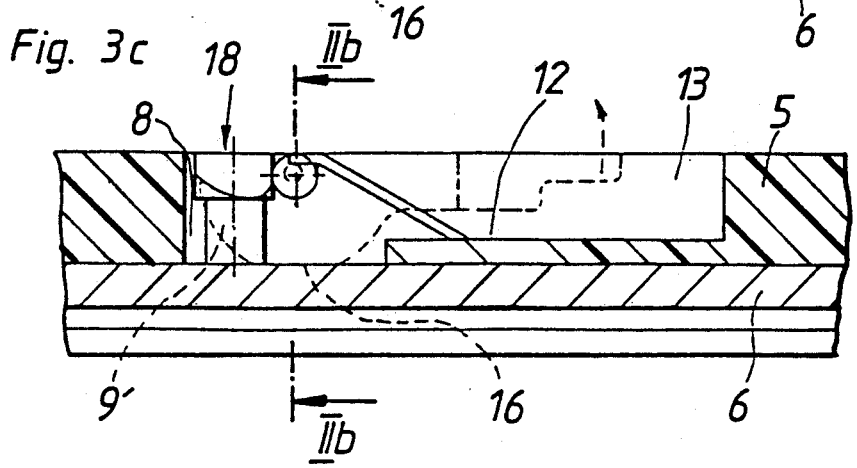
FIG. 3c shows the same sun roof in another section, according to FIGS. 3a and 3b, in which the bolt-handle piece combination is in locking position, again without cover and without cover seal.
Figure 6A:
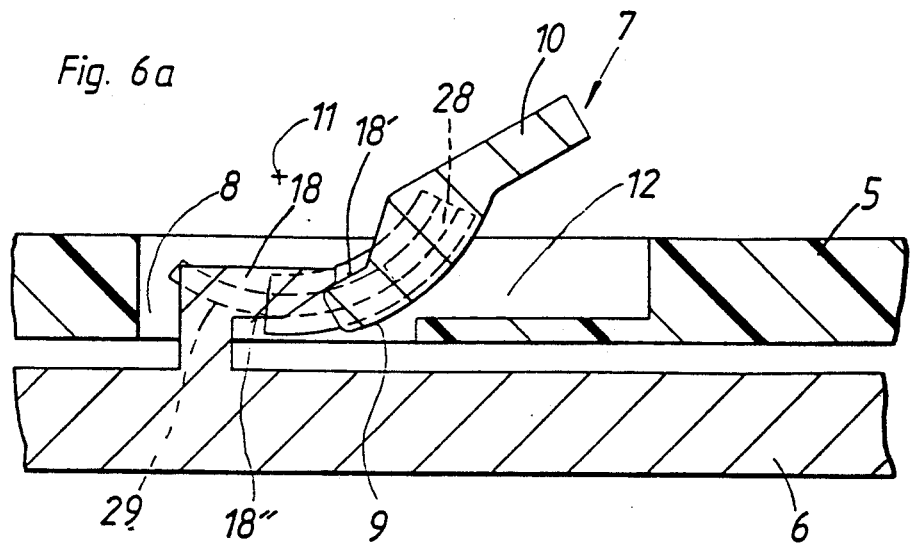
FIG. 6a shows another form of execution of a clamping mechanism according to the invention, in vertical section along the cover frame, (section along the line VIb—VIb in FIG. 6c), the bolt being in a fixing position.
Figure 6B:
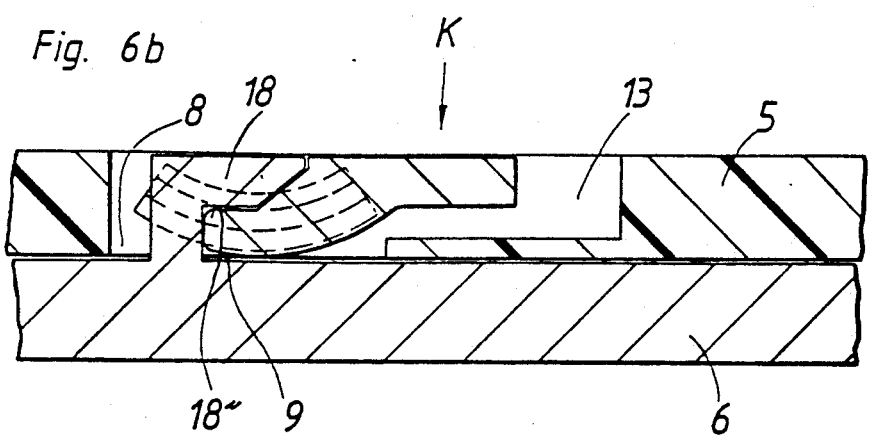
FIG. 6b is another section diagram of the same form of execution, along the line VIb—VIb in FIG. 6c, the bolt being in the locking position.
Figure 6C:
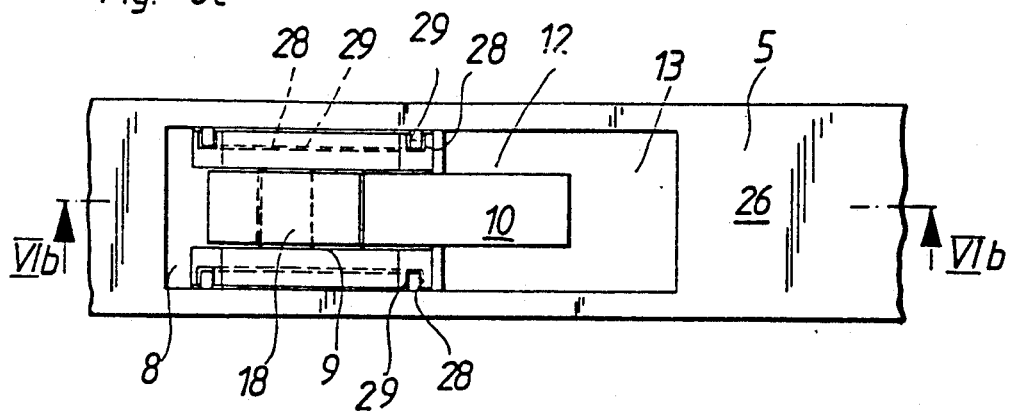
FIG. 6c shows a view from below of the same clamping mechanism (view K in FIG. 6b).

As can be seen from the sequence of FIGS. 3a to 3c, the arms 9' of the bolt 9 project into the openings 8 of the inner frame 5. After merely fitting together the outer and inner frames, the bolt 9 and its respective handle 10 are at first about perpendicular to the plane of the cover frame 3, and are arranged opposite each other relative to the swinging axis. On swinging the handle 10 in the direction of the cover frame 3, the arms 9' of the bolt 9 extend behind the arms of the T of the blocking member 18. The hook-shaped sliding surfaces 18' of the arms 9' then slide along the sliding surfaces 18'' of the blocking element 18. Preferably the sliding surfaces 18' and 18'' engage into the large-surface mutual contact shown in the locking position in FIG. 3c. In the locking position, the blocking member 18 is drawn farthest into the openings 8 of the inner frame 5. In this position, at the close of a temporary elastic deformation in the zone of the clamping device, which has first taken place, one of the flat upper surfaces 16 of the bolt 9, lying opposite the sliding surface 18, lies against the outer frame 6. In this position, the handle piece 10 is completely received in a depression 12 of the inner frame 5. This depression 12 closes directly against the opening 8 and is large enough to form an opening 13 at the free end of the handle 10, through which any necessary opening of the bolt is facilitated.

As can be seen from the sequence of FIGS. 3a to 3c, the combination, according to the invention, of a blocking member 18 with a bolt 9 which can swing, makes possible a relatively great clamping distance, while with increasing swinging of the bolt 9, the effective lever arm between the blocking member 18 and this axis of swinging 11 of the bolt 9 becomes increasingly shorter. For the application of the force necessary for the swinging of the bolt 9, it suffices if the effective length of the handle 10 is a multiple of the effective lever length between the blocking member 18 and the axis of swinging 11.

Figure 7A:
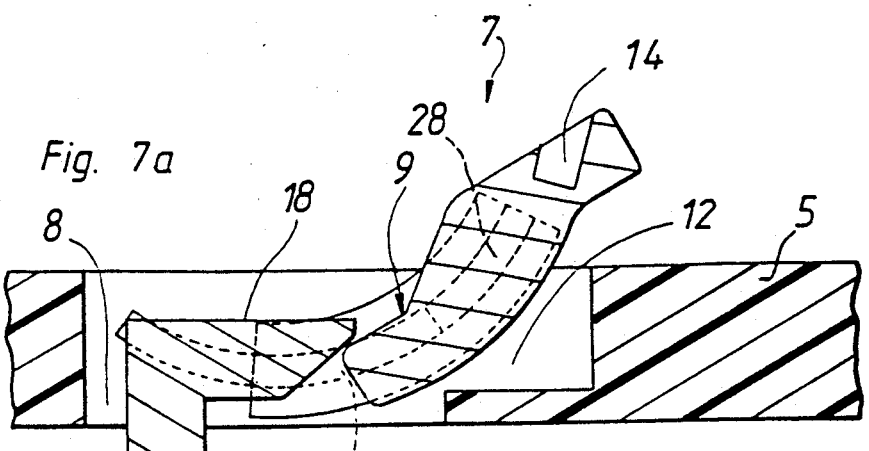
FIG. 7a to 7c shows a similar form of execution, as in FIGS. 6a to 6c, in which the bolt has, instead of a handle, merely a depression to receive a handle piece, in identical representation.
Figure 7B:
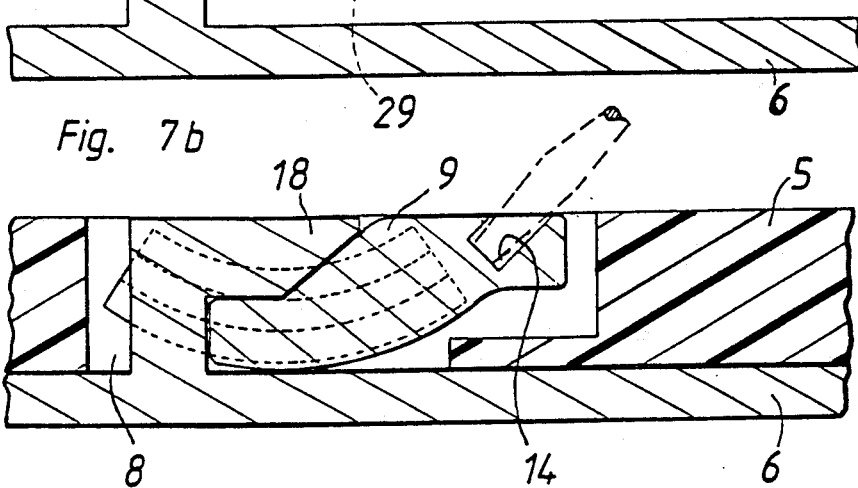
Figure 7C:
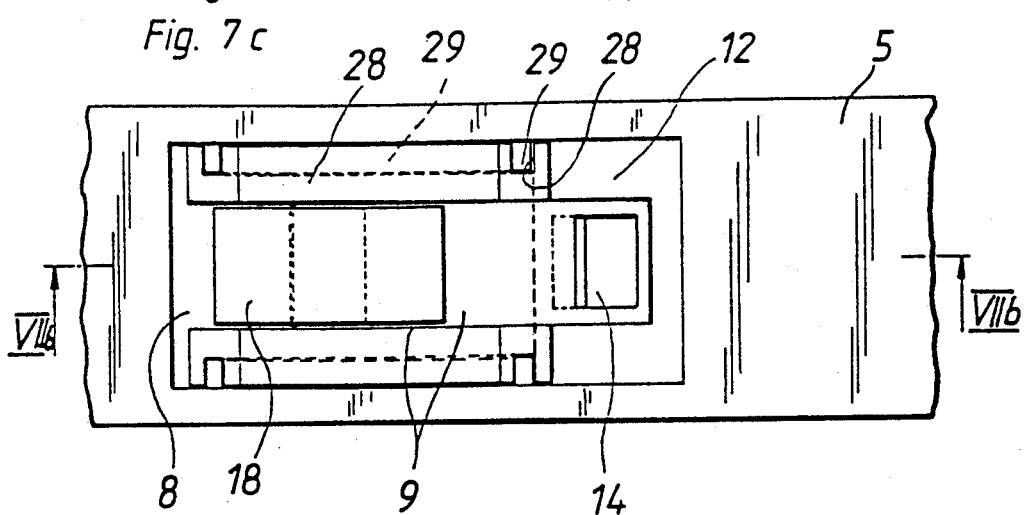
Figure 11A:
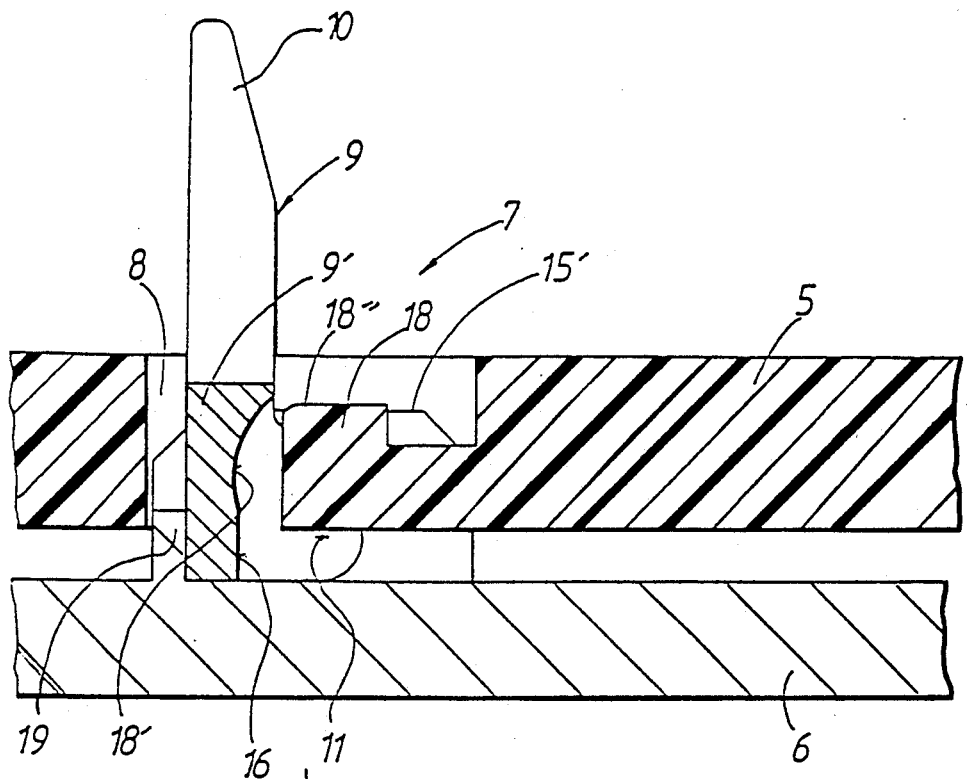
FIG. 11a shows, from the same sun roof, an enlarged detail of a clamping device in vertical section (along line XI—XI in FIGS. 8b, 9b, and 10B), in installed condition, but with the bolt not yet swung into the locking position.
Figure 11B:
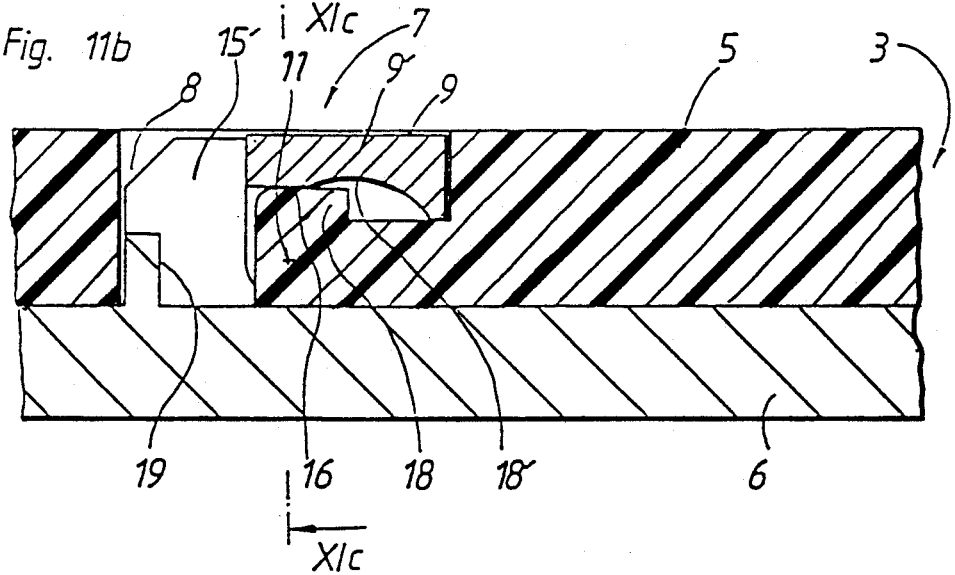
FIG. 11b shows the same detail, but with the bolt swung into the locking position.
Figure 11C:
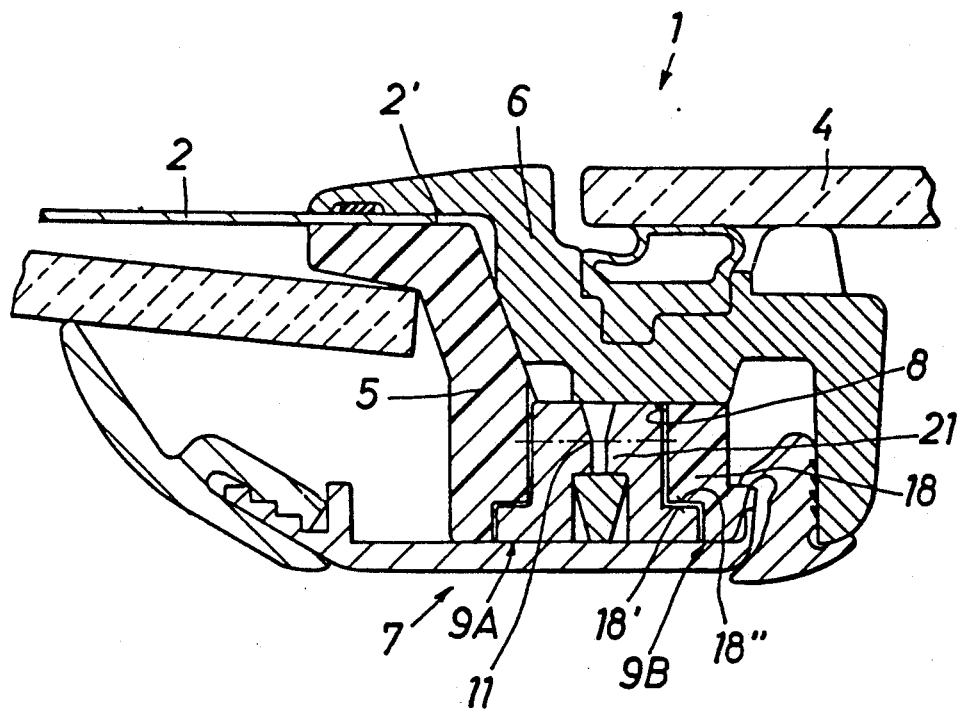
FIG. 11c shows, in radial section, a preferred form of execution of the sun roof in FIG. 11b (section line XIc—XIc in FIG. 11b).

If there is not sufficient space for the placing of the handle 10, a screw driver or the like may also be used as a handle, and can be pushed into a slot 14 of the bolt 9. (See FIGS. 7a to 7c).

In FIGS. 6a to 7c there is shown another form of execution of a bolt 9 and a blocking member 18. Here, the blocking member has a hook form, pointing in the direction of the bolt, still not swung, as shown in FIG. 5c. But the essential difference from the form of execution in FIGS. 3a to 4c is in the different kind of support of the bolt 9 in the inner frame 5. Instead of swing bearing pivots, arc-form guide grooves 28 are formed in the right and left side surfaces of the bolt 9. Corresponding guide stays 29 engage in these guide grooves 28. The guide stays 29 are arranged in the inner frame 5, beside the openings 8. Through this kind of support the bolt 9, in swinging, can describe, besides a swinging movement around the axis of swinging, also a movement along in the direction of the locking element. In this way, there is attained especially great safety against an undesired self opening of the clamping device. Moreover, through this kind of support, relatively great bearing surfaces can be obtained. Also, the clamping force is distributed over a large area, which is an advantage, especially for the preferred plastic clamping devices and which increases the friction resistance against an involuntary loosening of the clamping device.

In the example of execution most preferred at present, according to FIGS. 8a to 11c, unlike the previous examples, the blocking member is arranged on the inner frame 5, having the openings 8, and the corresponding bolt 9 on the outer frame 6, not having an opening. In this way, the bolt, in the assembling of the outer and inner frame, must first be thrust into or through the opening 8 (see FIG. 11a), before it can be swung into the locking position (according to FIGS. 11b and 11c). In the example according to FIGS. 8a to 11c, moreover, a different swing support of the bolt 9 is provided than in the preceding examples; namely, the support takes place by means of a bearing support 15', which is fastened to the outer frame 6 or formed in one piece with it. This bearing support 15' is approximately planar and has an opening arranged transverse to the frame strips 3'', preferably a bore, the cylindrical surface of which serves as the bearing surface 15. This is shown best in FIGS. 9a and 9b.

In this example, as can be seen especially from FIGS. 10a and 10b, the bolt 9 again has two arms 9', arranged parallel and connected with each other by a handle 10, so that, seen from above or below, the whole bolt is, in effect, a U-shaped body. On the inner leg surfaces of the U are disposed swing bearing pivots 21, facing each other. The whole bolt 9 is spring-elastic so that with a slight spreading of the U legs, bearing the arms 9', it can be pushed along on the bearing stand 15', until the swing bearing pivots engage in the bores of the bearing stand 15'. The swing bearing pivots 21 and the bearing surfaces 15 then form the swing bearing of the bolt 9. A catching cam 19 on the bearing stand 15' holds the bolt 9 in the perpendicular (unlocked) position, to facilitate the bringing together of the outer and inner frames (see, in particular, FIG. 11a).

The blocking members 18, by their sliding surfaces 18'' are arranged in pairs, opposite each other, at the side edges of the opening 8 on the inner frame 5. The other parts have the same function and are given the same reference numbers as in the preceding examples. For clarity, in FIGS. 8a to 11b, the outer and inner frames have not been shown in detail; this has been done, for example, in FIGS. 2a, 2b, 4a, 4b, and in 11c. The form of execution in FIGS. 8a to 11c can be produced especially simply and allows the transmission of higher clamping forces, while at the same time obtaining relatively great clamping distances.

Figure 12A:
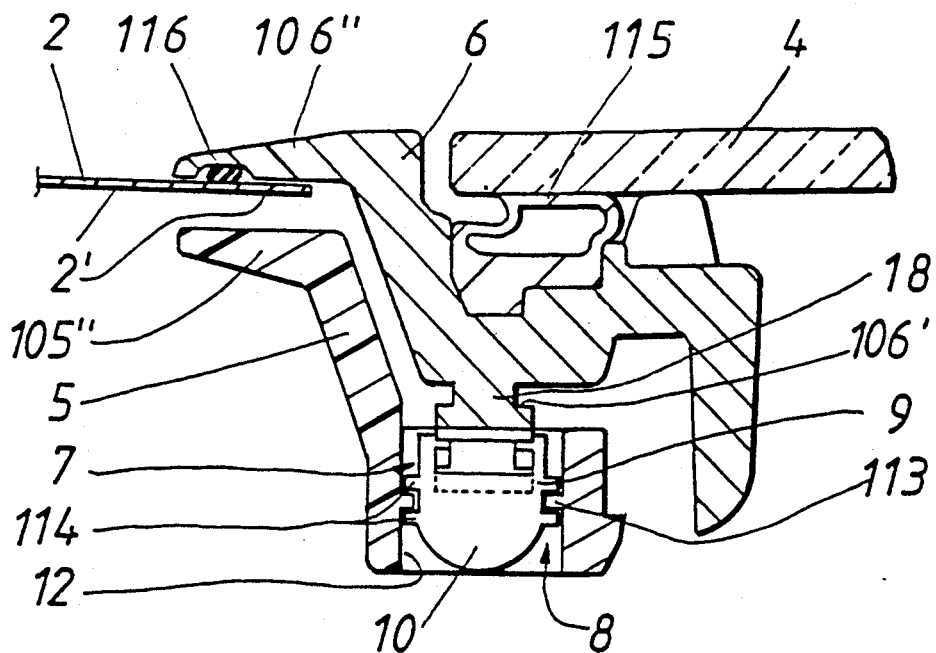
FIGS. 12a and 12b show, for a sun roof in another alternative form of execution, a vertical section through the cover frame, transverse to the direction of extension of the frame strips; in both figures, the sun roof is in the installed condition, in FIG. 12a with the inner and outer frame not yet clamped, and in FIG. 12b, in the locking position, that is, in the clamped condition.
Figure 12B:
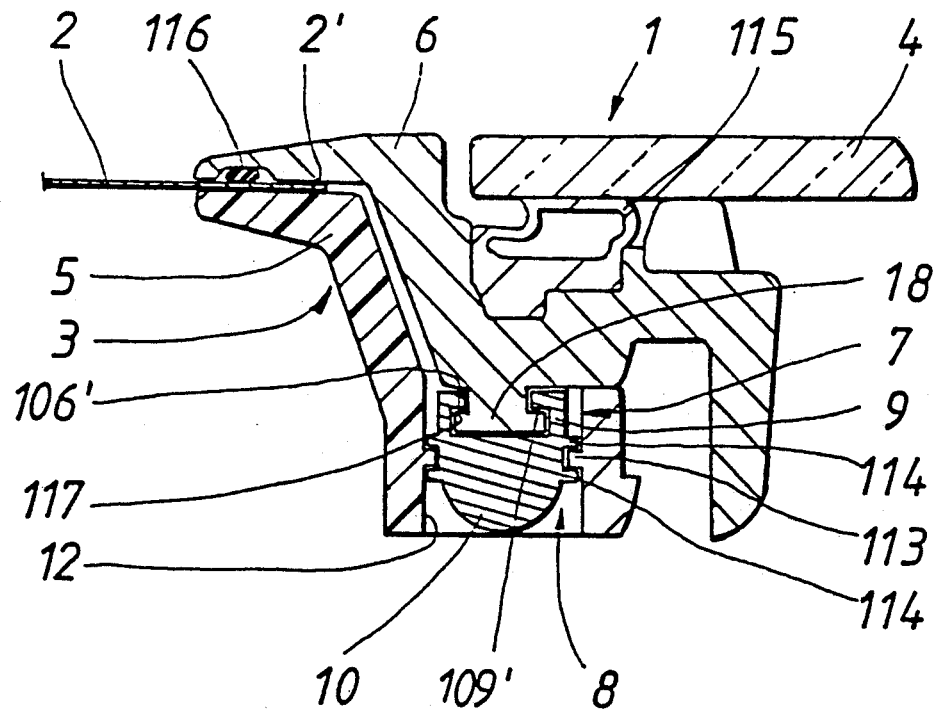

From FIGS. 12a and 12b and the further Figures, it can be seen that the outer frame 6 and the inner frame 5 can be clamped together, by another alternative clamping device 7, so that they clamp between them the opening edge 2' of the roof covering 2 of the vehicle while a frame seal (gasket) 116 seals the roof covering and the cover frame 3. The vehicle roof opening left free by the cover frame 3 may be closed by a cover 4, which can preferably be opened, with interposing of a cover seal 115. In the openings 8 there are provided strips serving as frame-side guide elements 113. These extend parallel with each other and parallel with the longitudinal extent of the frame strips 3'', and are arranged in each case at the edge of the openings 8, preferably joined in one piece with the inner frame 5.

Within each opening 8 is arranged a movable bolt 9. The bolt 9 has a groove forming bolt-side guide elements 114. These correspond in form and arrangement to the frame-side guide elements 113, and permit the movement, without tilting, of the bolt 9 within the opening 8, in the direction of movement AA (see FIGS. 13b and 13c). Through the guide elements 113 and 114 the bolt 9 is at the same time supported against the inner frame 5, so that it can transmit clamping forces to the outer frame 6 in a direction approximately perpendicular to the plane of the roof covering 2. The movement of the bolt 9 can take place without a tool. For this purpose, the bolt is provided with a handle 10 which may be held fast between the thumb and index finger of one hand of the installer, for example. Also, the handle 10 can disappear completely into a depression 12, formed by the opening 8, so that the clamping device 7 is arranged completely within the cross section of the cover frame and does not project out of the latter, at least in the locking position as shown in FIG. 12b.

The outer frame 6 is provided with blocking members 18, distributed on the circumference (perimeter); these may be made in one piece with the frame 6 or may be joined by screws or the like. The blocking members 18 are so arranged that, after the loose placing together of the outer frame 6 with the inner frame 5, each can cooperate with a bolt 9. For this purpose, in the example shown, the blocking member 18 of the outer frame 6 projects into the opening 8 of the inner frame 5. The bolt 9 has, for this purpose, a blocking element receiver 117, which is formed and arranged so that it corresponds to the blocking member 18 and makes possible a support of the bolt 9 also against the outer frame 6. Thus, the clamping forces between the bolt 9 and the blocking element 18 are transmitted, preferably completely perpendicularly to the plane of the roof covering 2, but having at least a force component perpendicular to the plane of the roof covering 2. The blocking members 18 and their receivers 117 are also formed and arranged so that the bolt 9 can be pushed along the blocking member 18 in the direction AA.

The blocking member receiver 117 and the blocking member 18 may also have a guiding function, as the guide elements 113 and 114 have. Similarly, the guide elements 113 and 114 may also take over the function of a blocking member 18 or its receiver. It is only crucial that the bolt 9 can be pushed in relation to both the inner frame 5 and the outer frame 6, in the pushing direction AA, and at least when in the locking position BB exerts a clamping force between the outer frame 6 and the inner frame 5.

As can be seen from FIGS. 13a and 13c, locking pressure surfaces 106' and 109' are provided both in the cover frame and on the bolt. These locking pressure surfaces form an oblique angle, preferably between 1° and 45°, with the pushing direction of the bolt 9. Each clamping device 7 has a pair of these surfaces, arranged opposite each other; that is, corresponding locking pressure surfaces so formed and arranged that upon pushing the bolt into the locking position B, they come in contact, flat against each other, and slide one on the other. Through this wedge-shaped direction of the locking pressure surfaces, the inner frame 5 and the outer frame 6 can be moved toward or away from each other. An increasing clamping force results as soon as the collars 106" and 105" of the outer and inner frame come to lie against the upper and lower sides of the roof covering 2. As soon as the bolt 9 has reached its locking position B, as a rule, the maximum possible clamping force between the outer and inner frame is reached. An undesired automatic pushing back of the bolt 9 is impossible because of the high pressure force caused by the wedge form, and the associated self-limitation.

As shown further from FIGS. 13a to 13c, the possible pushing distance of the bolt 9 may be chosen large enough so that the bolt 9 can still be moved along in relation to the frame strips, even when the blocking member 18 and its receiver 117 are no longer engaged. This is the case when the bolt is in the starting position, marked CC in FIG. 13b; that is, at the beginning of the guided pushing distance. Even before the outer frame 6 and the inner frame 5 have been placed together, and the blocking member 18 of the outer frame 6 dipped into the opening 8 of the inner frame 5, the bolt 8 may be in its starting position CC, because in this position, it does not hinder the dipping of the blocking member 18 into the opening 8.

Finally, the opening 8 is somewhat longer than the frame-side guide element 113. As a result, in the extension of the guide element, there is a threading zone DD, into which the bolt 9 can be guided into the opening 8, approximately perpendicular to the pushing direction AA. The corresponding guide elements 113 and 114 or the blocking element 18 and the corresponding receiver 117, come into engagement with each other only by the pushing of the bolt 9 in the pushing direction AA. In FIG. 2a, the bolt 9 is shown already in the starting position A, in which it is engaged with the frame-side guide element 14, but not with the blocking member 18.

Figure 14:
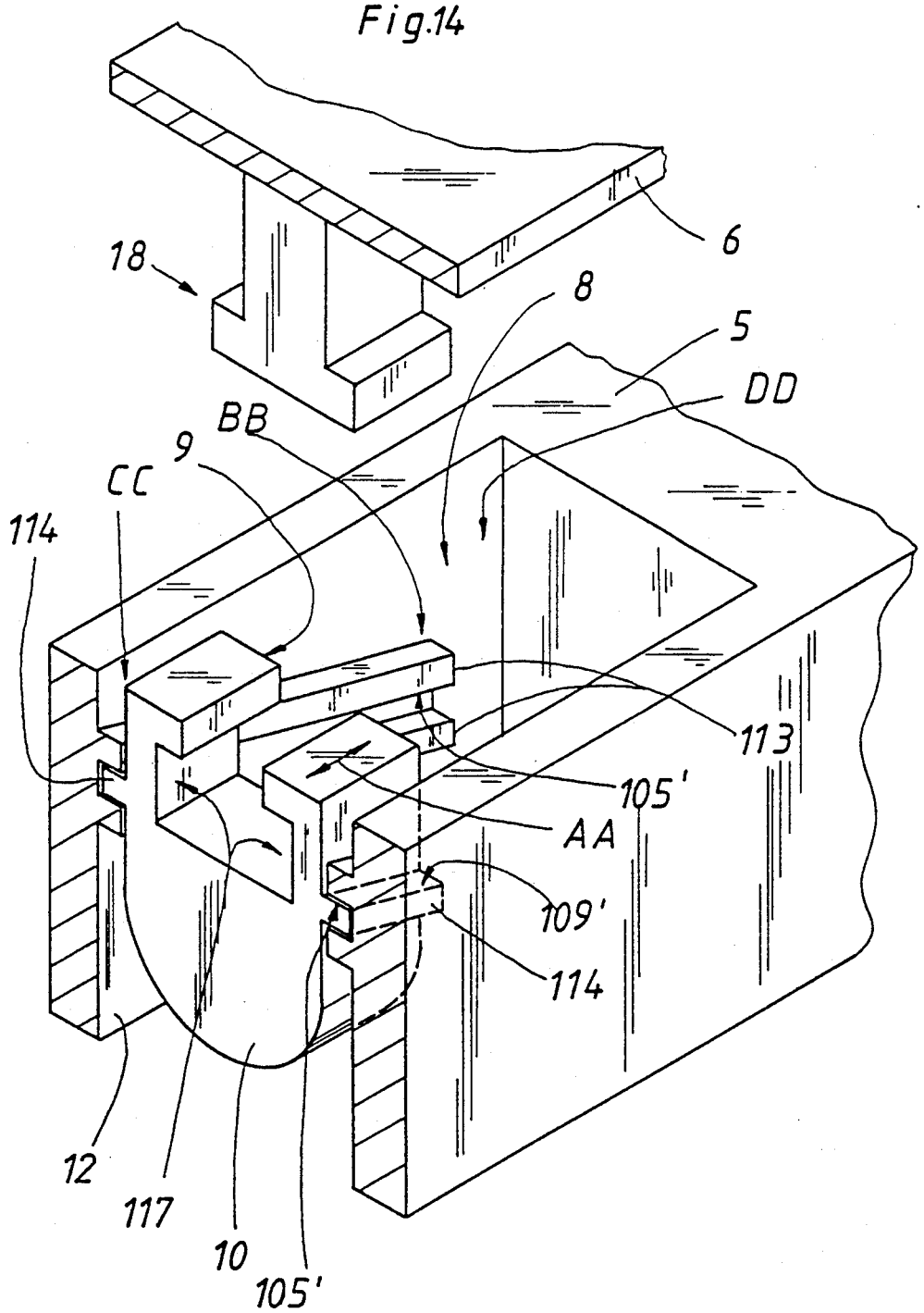
FIG. 14 shows a second form of execution of a clamping device for a sun roof according to FIGS. 12a and 13c in enlarged detail perspective section.
Figure 15:
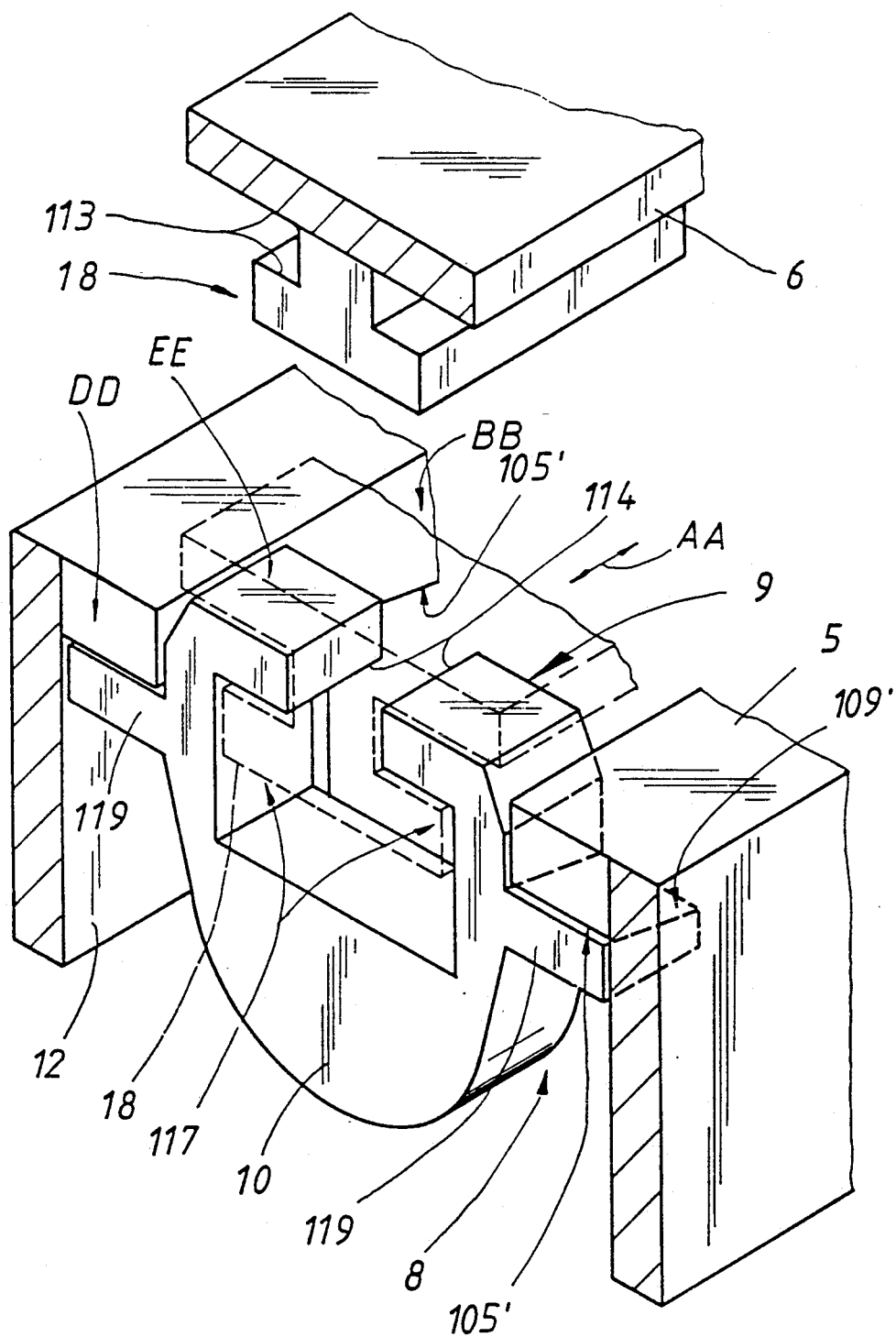
FIG. 15 shows a third form of execution of a clamping device for the same sun roof in the same representation.
Figure 16:
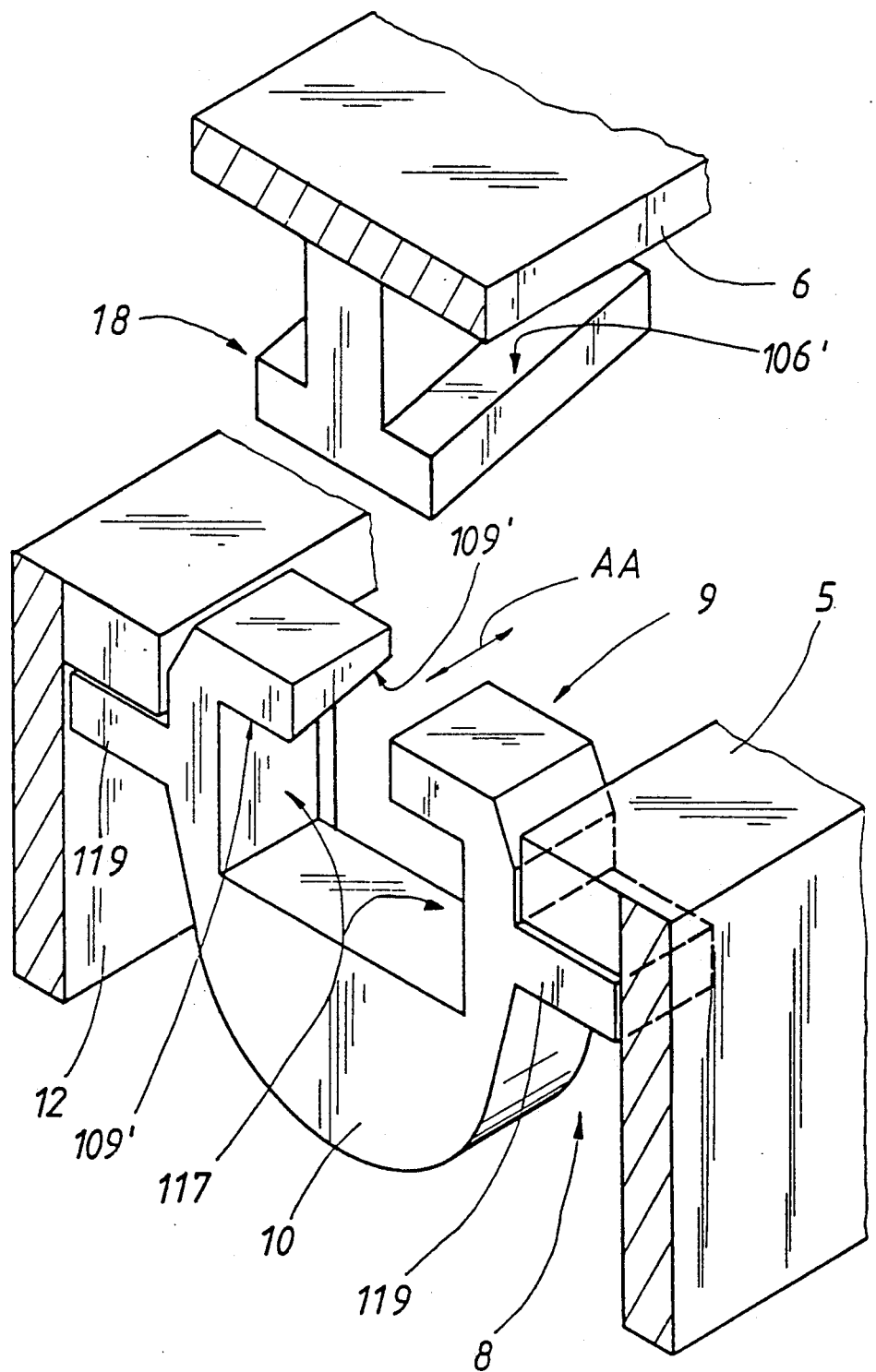
FIG. 16 shows a fourth form of execution of same, in same representation.

FIGS. 14 to 16 show alternative forms of execution of the clamping devices in FIGS. 12a to 13c.

In FIG. 14, the frame-side guide elements 113 are again on the inner frame 5. They are inclined in wedge form from the pushing direction AA, and have locking pressure surfaces 105', which cooperate with the locking pressure surfaces 109' of the corresponding inclined bolt-side guide elements 114. In this case, therefore, the guide elements 113 and 114 have a double function, while the blocking member 18 on the outer frame 6 and its receiver 117 on the bolt 9, have only the function of the mutual transmission of clamping forces, thus a mutual support with simultaneous assurance of the mobility of the bolt 9 in the pushing direction AA. With this form of execution, unlike that in FIGS. 12a to 13c, the bolt 9 is first introduced into the threading zone DD of the opening 8 of the inner frame 5 and pushed into the starting position EE. Only then can the outer and inner frames be joined together and the two clamped against each other. Unlike the previous example, therefore, it is not possible to replace a single bolt later, if the rest of the bolts are already in the locking position.

In the third form of execution, according to FIG. 15, the bolt 9 is guided in the zone of the blocking member 18 on the outer frame 6. The locking pressure surfaces 105' and 109' (as in FIG. 4) are again on the inner frame and the corresponding support elements 19 of the bolt 9 are arranged as collars on the bolt 9. In this example of execution, the threading zone DD (as in the first form of this kind, in FIGS. 12a to 13c), in relation to the locking position BB, is at the beginning of the pushing distance. In the position of the bolt 9 shown in FIG. 15, this latter is already engaged with the blocking member 18, which because of the exploded view is shown above the bolt 9. The actual position of the blocking member 18 is shown in broken line. In the illustrated fixing position (EE) of the blocking bolt 9, this still transmits no clamping force, or at least not the full clamping force so that the adjusting of the cover frame into the final desired position, as well as a checking of the seat of the frame seal, is still possible. In this case, the outer and inner frames are at first loosely laid together and at two or more places, a bolt and one blocking member, in each case, are threaded into the threading zone DD and pushed into the fixing position EE.

The fourth form of execution of this kind, in FIG. 16, differs from the third form, in FIG. 15, only by the fact that the blocking member 18 and its receiver 17 perform also the wedging function and have correspondingly inclined locking pressure surfaces 106' and 109'.

FIG. 17a shows how, by means of a push rod 111, several bolts 9 can be pushed at the same time, into the locking position shown there. The pushing force necessary for this is applied especially well by the fact that hingedly attached to the push rod 111 are two push rod members 111A and 111B, one after the other. The push rod member 111B, farthest from the push rod 111, is supported swingable in relation to the inner frame 5. In the extended position shown in FIG. 17a of the two push rod members 111A and 111B, the bolts 9 are fastened immovably, just as with a catching in this position.

In the starting position, shown in FIG. 17b, of the push rod 111, the two push rod members 111A and 111B are in an angled position relative to each other. If force is exerted on the handle 10 toward the extended position, the push rod 111 is pushed along increasingly into the locking position, while at the transition to the push rod member 111A, by means of pins 120, arranged in pairs, the push rod 111 is guided into guide grooves 121 in the inner frame 5, provided in pairs and correspondingly arranged and formed. This arrangement has the advantage of an increasing intensifying of force, the nearer the push rod members 111A and 111B are brought to the extended position.

An arrangement corresponding in principle to the push rod 111 is known from German Disclosure 3,329,407. This known arrangement, however, unlike the invention, serves for the frequent loosening and locking of a hard top, while the locking does not take place with wedge (inclined) surfaces.

We claim:

1. A sun roof for a motor vehicle having a body with a roof panel, comprising:

a frame assembly having first and second frame parts, said assembly for fastening to the vehicle body by clamping the vehicle roof panel between said first and second frame parts adjacent the edge of an opening in the vehicle roof panel; and a cover which can be movably mounted to the frame assembly and which can be opened and closed to open and close said sun roof;

said frame assembly including a plurality of clamping means spaced around the circumference of said frame assembly for providing clamping force to clamp the vehicle roof panel between said first and second frame parts;

each said clamping means comprising a respective bearing surface on said first frame part, a respective support surface on said second frame part, and a respective bolt having a contact surface;

in each clamping means said bolt being supported on said support surface of said second frame part for clamping movement between (i) a first position in which said bolt contact surface is not in force-transmitting engagement with said bearing surface on said first frame part, and (ii) a second position in which said bolt is in force-transmitting engagement with said support surface on said second frame part and said bolt contact surface is in force-transmitting engagement with said bearing surface on said first frame part to provide the clamping force necessary to clamp the vehicle roof panel between said first and second frame parts of said frame assembly;

said bolt contact surface having a concave shape, said concave contact surface of said bolt sliding along said bearing surface of said first frame part during movement of said bolt from its first to its second position;

said bolt being a member separate from said first and second frame parts and having a length sufficient that said bolt contact surface engages said bearing surfaces on said first frame part to begin the clamping movement of said bolt when said first frame part is spaced substantially from said second frame part, to thereby draw said first frame part closer to said second frame part during movement of said bolt from its first position to its second position;

said bolt being journalled on said support surface on said second frame part for pivotal movement relative to said first and second frame parts, said concave contact surface of said bolt sliding along said bearing surface of said first frame part during pivoting movement of said bolt from its first position to its second position;

said bolt when in its first position being disposed approximately perpendicular to the plane of the vehicle roof panel, and when pivoted into its second position being disposed approximately parallel to the plane of the vehicle roof panel.

2. A sun roof for a motor vehicle having a body with a roof panel, comprising:

a frame assembly having first and second frame parts, said assembly for fastening to the vehicle body by clamping the vehicle roof panel between said first and second frame parts adjacent the edge of an opening in the vehicle roof panel; and a cover which can be movably mounted to the frame assembly and which can be opened and closed to open and close said sun roof;

said frame assembly including a plurality of clamping means spaced around the circumference of said frame assembly for providing clamping force to clamp the vehicle roof panel between said first and second frame parts;

each said clamping means comprising a respective bearing surface on said first frame part, a respective support surface on said second frame part, and a respective bolt having a contact surface;

a flat force-transmitting portion of said bearing surface on said first frame part facing away from said second frame part and a curved force-transmitting portion of said support surface on said second frame part facing away from said first frame part;

in each clamping means said bolt being supported on said support surface of said second frame part for clamping movement between (i) a first position in which said bolt contact surface is not in force-transmitting engagement with said force-transmitting portion of said bearing surface on said first frame part, and (ii) a second position in which said bolt is in force-transmitting engagement with said force-transmitting portion of said support surface on said second frame part and said bolt contact surface is in force-transmitting engagement with said force-transmitting portion of said bearing surface on said first frame part to provide the clamping force necessary to clamp the vehicle roof panel between said first and second frame parts of said frame assembly;

said bolt contact surface having a concave shape, said concave contact surface of said bolt sliding along said force-transmitting portion of said bearing surface on said first frame part during movement of said bolt from its first to its second position.

3. Aسسun roof as defined in claim 1 wherein said clamping means includes surface means on said first frame part for defining a locking recess in said frame assembly when said bolt is in its second position, said locking recess being completely within the cross-sectional area of said frame assembly, said bolt when in its second position being disposed within said locking recess.

4. A sun roof as defined in claim 1 wherein at least one of said first and second frame parts and said bolt is made of plastic.

5. A sun roof for a motor vehicle having a body with a roof panel, comprising:

a frame assembly having first and second frame parts, said assembly for fastening to the vehicle body by clamping the vehicle roof panel between said first and second frame parts adjacent the edge of an opening in the vehicle roof panel; and a cover which can be movably mounted to the frame assembly and which can be opened and closed to open and close said sun roof;

said frame assembly including a plurality of clamping means spaced around the circumference of said frame assembly for providing clamping force to clamp the vehicle roof panel between said first and second frame parts;

each said clamping means comprising a respective bearing surface on said first frame part, a respective support surface on said second frame part, and a respective bolt having a contact surface;

in each clamping means said bolt being supported on said support surface of said second frame part for clamping movement between (i) a first position in which said bolt contact surface is not in force-transmitting engagement with said bearing surface on said first frame part, and (ii) a second position in which said bolt is in force-transmitting engagement with said support on said second frame part and said bolt contact surface is in force-transmitting engagement with said bearing surface on said first frame part to provide the clamping force necessary to clamp the vehicle roof panel between said first and second frame parts of said frame assembly;

said bolt contact surface having a concave shape, said concave contact surface of said bolt sliding along said bearing surface of said first frame part during movement of said bolt from its first to its second position;

said bolt comprising first and second bolt arms which enclose between them said support surface of said second frame part.

6. A sun roof as defined in claim 1 wherein said bolt includes a handle portion for manual actuation of said clamping means by movement of said bolt from its first position to its second position.

* * * * *